United States Patent
Danziger

(10) Patent No.: US 12,399,371 B1
(45) Date of Patent: Aug. 26, 2025

(54) DOUBLE-HELIX ONTO A SINGLE LIGHT-GUIDE OPTICAL ELEMENT (LOE)

(71) Applicant: LUMUS LTD., Ness Ziona (IL)

(72) Inventor: Yochay Danziger, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 19/120,479

(22) PCT Filed: Oct. 17, 2023

(86) PCT No.: PCT/IB2023/060461
§ 371 (c)(1),
(2) Date: Apr. 11, 2025

(87) PCT Pub. No.: WO2024/084383
PCT Pub. Date: Apr. 25, 2024

Related U.S. Application Data

(60) Provisional application No. 63/417,215, filed on Oct. 18, 2022.

(51) Int. Cl.
*G02B 27/01* (2006.01)
*F21V 8/00* (2006.01)

(52) U.S. Cl.
CPC ....... *G02B 27/0172* (2013.01); *G02B 6/0076* (2013.01); *G02B 2027/0125* (2013.01)

(58) Field of Classification Search
CPC .............. G02B 27/0172; G02B 6/0076; G02B 2027/0125; G02B 27/00; G02B 27/01; G02B 27/10
USPC ......................................................... 359/629
See application file for complete search history.

(56) References Cited

U.S. PATENT DOCUMENTS

| | | |
|---|---|---|
| 10,437,068 B2 | 10/2019 | Weng et al. |
| 2015/0247976 A1 | 9/2015 | Abovitz et al. |
| 2018/0052276 A1* | 2/2018 | Klienman ............... G06F 3/013 |
| 2018/0267312 A1 | 9/2018 | Melli |
| 2020/0116996 A1* | 4/2020 | Lee .................... G02B 27/0081 |
| 2020/0192111 A1 | 6/2020 | Ishii et al. |
| 2020/0292819 A1* | 9/2020 | Danziger ............. G02B 6/0018 |
| 2021/0333862 A1 | 10/2021 | Shimizu |
| 2022/0099975 A1 | 3/2022 | Schultz et al. |

(Continued)

FOREIGN PATENT DOCUMENTS

CN 112637576 B 6/2024

*Primary Examiner* — Henry Duong
(74) *Attorney, Agent, or Firm* — Scully, Scott, Murphy & Presser

(57) ABSTRACT

An optical device may include a first waveguide to receive and expand in a first dimension a first portion of guided image beams based on a first image field and provide a first plurality of expanded image beams; a second waveguide to receive and expand in the first dimension one of a second portion of guided image beams and a transmitted second portion of guided image beams corresponding to a second image field that is different from the first image field and to provide a second plurality of expanded image beams, the second waveguide to receive the first plurality of expanded image beams and provide a transmitted first plurality of expanded image beams; and a third waveguide to receive and expand in a second dimension the transmitted first plurality of expanded image beams and the second plurality of expanded image beams to provide a third plurality of expanded image beams.

20 Claims, 6 Drawing Sheets

(56) References Cited

U.S. PATENT DOCUMENTS

2022/0108458 A1     4/2022   Vostrikov et al.
2024/0004189 A1     1/2024   Ronen

* cited by examiner

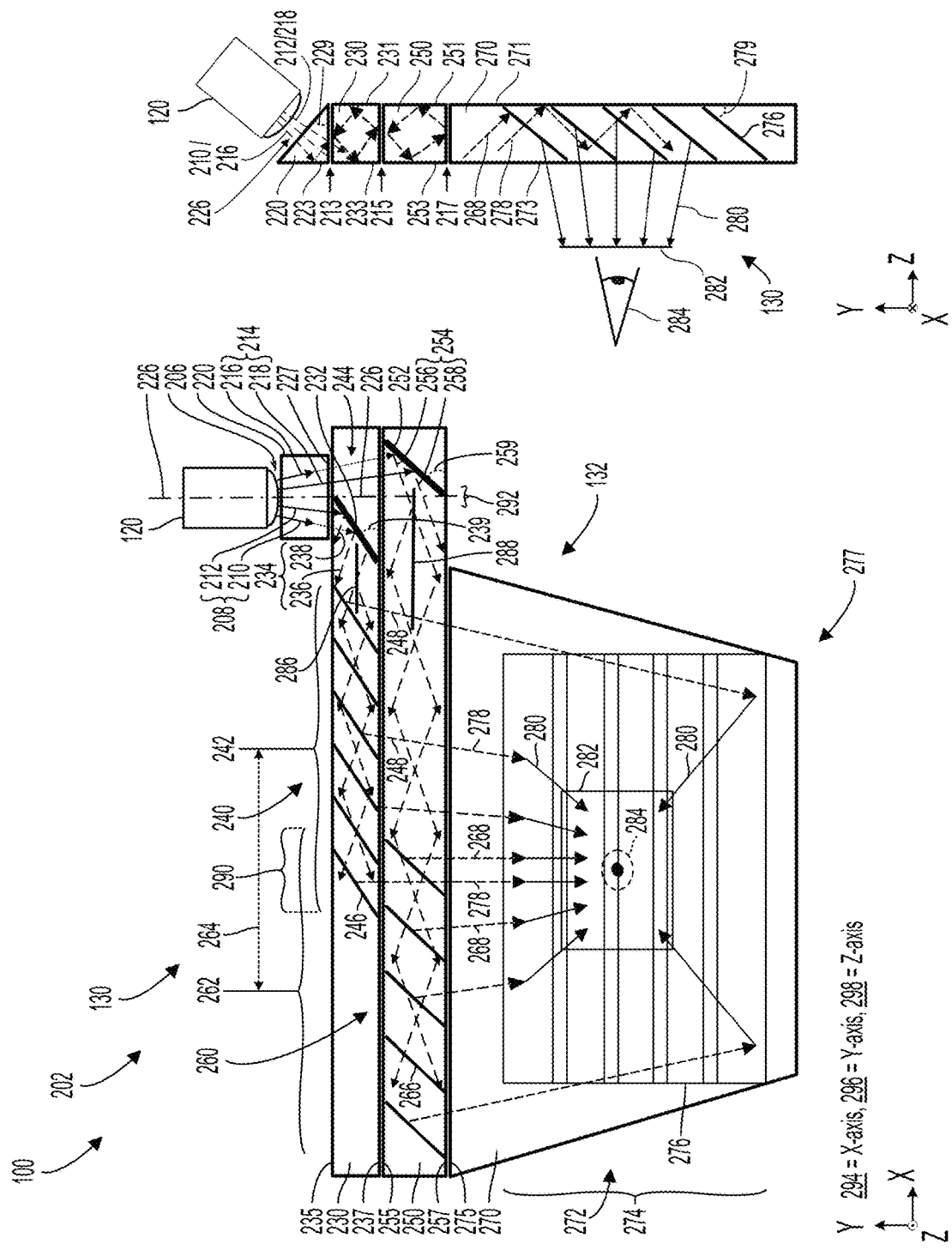

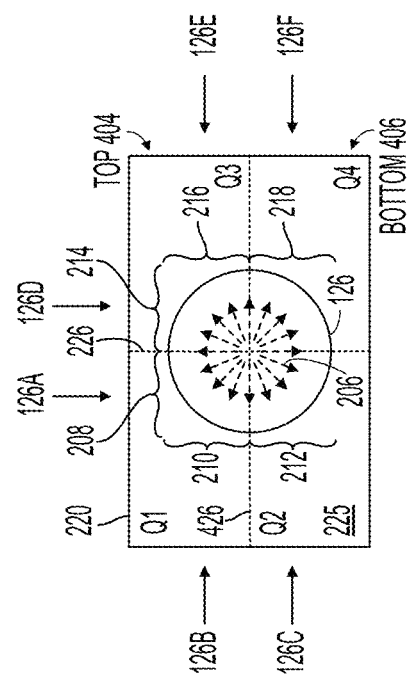
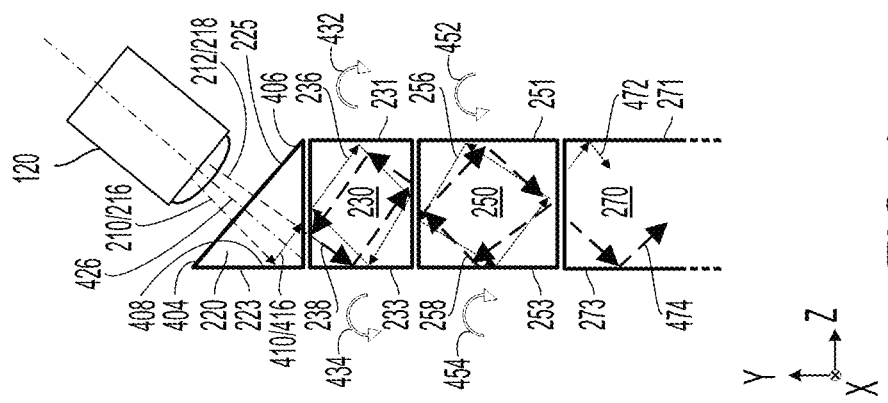
FIG. 5
FIG. 4

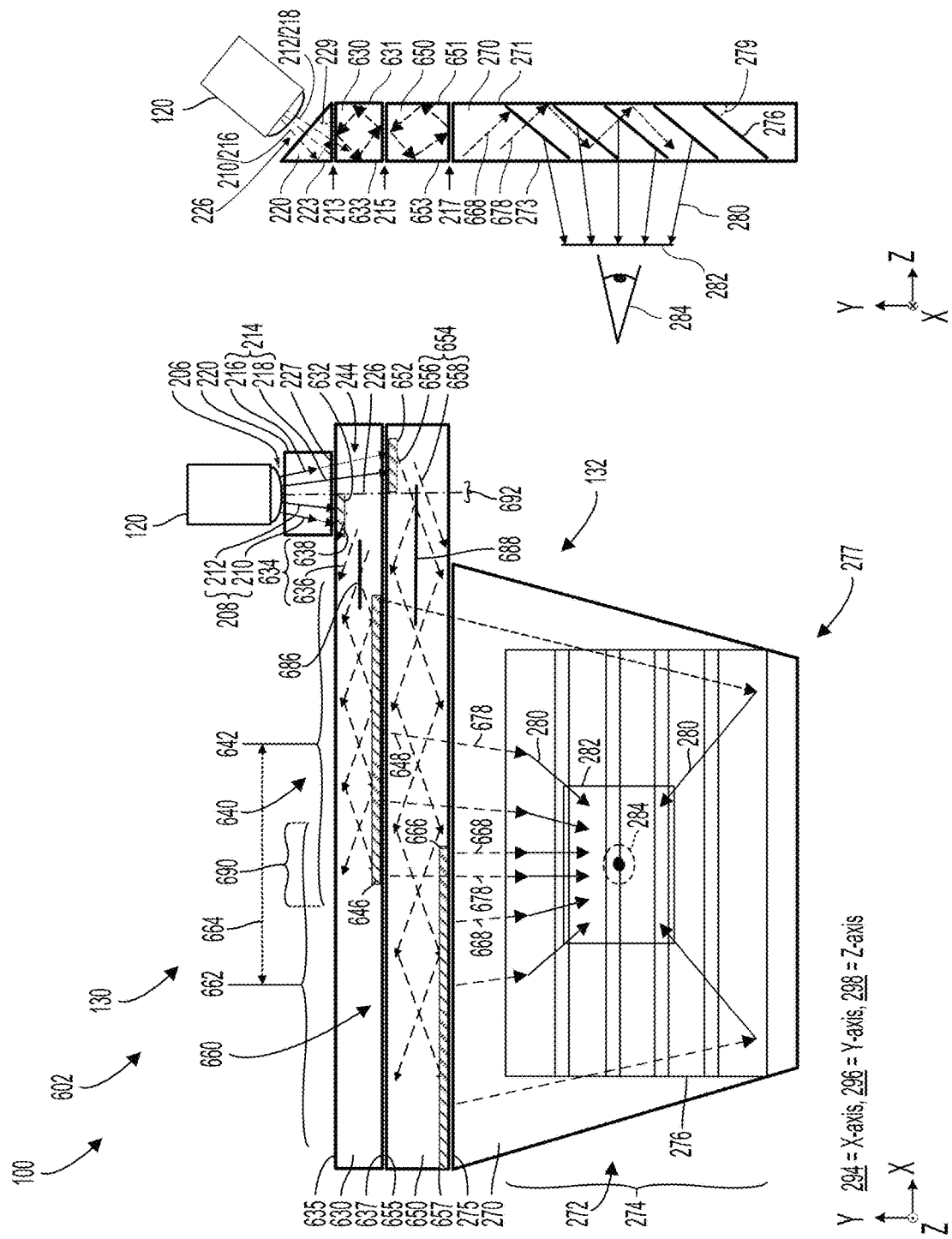

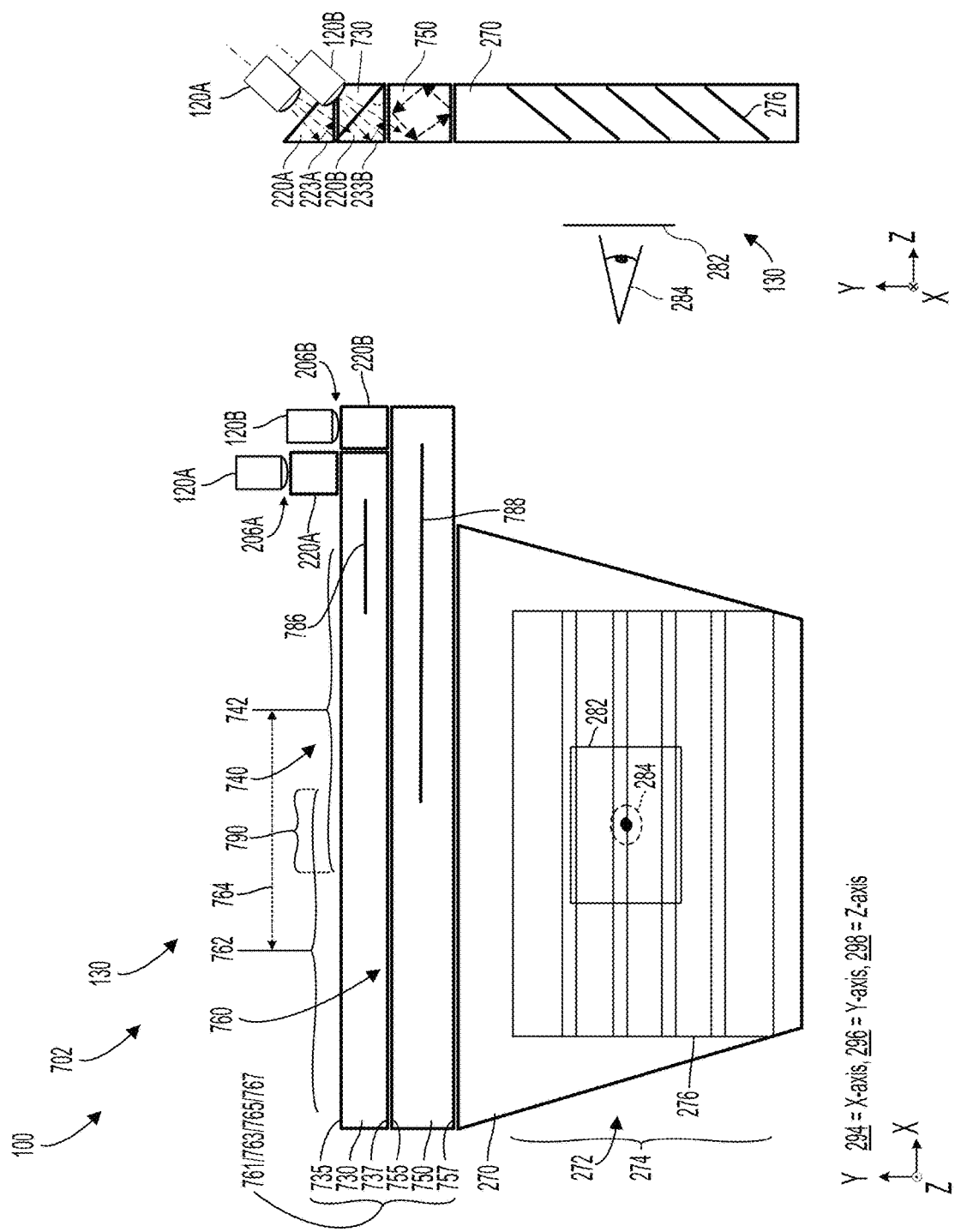

DOUBLE-HELIX ONTO A SINGLE LIGHT-GUIDE OPTICAL ELEMENT (LOE)

CROSS-REFERENCE TO RELATED APPLICATION

This application is based upon and claims the benefit of priority under 35 USC 119(e) of U.S. Patent Application No. 63/417,215 filed on Oct. 18, 2022, and titled "Double-Helix Onto a Single Lightguide Optical Element (LOE)," the disclosure of which is herein incorporated by reference in its entirety.

BACKGROUND

Unless otherwise indicated herein, the materials described in this section are not prior art to the claims in this application and are not admitted to be prior art by inclusion in this section. The present disclosure relates in general to optical devices and systems related to wearable devices for use in augmented reality applications, more particularly, to an improved wearable device for providing optical information directly to a user.

Wearable optical devices, such as near eye displays or smart glasses for use in augmented reality applications, are often cumbersome to wear and use, thus limiting their comfort and utility. Current wearable optical devices may also have a limited field-of-view (FoV) which can be undesirable for a user and could affect safety in some situations. However, total internal reflection (TIR) in a light-guide may limit a width of the FoV of the transmitted image. Also, low-refractive index of the light-guide materials may further reduce the available angular range to be transmitted. Finally, increasing the field-of-view may require pushing the limits of geometric boundaries, which can be heavy, expensive and may lead to a product form factor and/or aesthetic appearance which may not be acceptable in the marketplace. What is needed is a solution that addresses these issues, and others.

SUMMARY

According to an example, an optical device is generally described. The optical device may include a first waveguide configured to receive and expand in a first dimension a first portion of guided image beams based on a first image field and to provide a first plurality of expanded image beams; a second waveguide disposed adjacent to the first waveguide, the second waveguide configured to receive and expand in the first dimension one of a second portion of guided image beams and a transmitted second portion of guided image beams corresponding to a second image field that may be different from the first image field and to provide a second plurality of expanded image beams, the second waveguide configured to receive the first plurality of expanded image beams and provide a transmitted first plurality of expanded image beams; and a third waveguide disposed adjacent to the second waveguide on a side opposite the first waveguide, the third waveguide configured to receive and expand in a second dimension the transmitted first plurality of expanded image beams and the second plurality of expanded image beams to provide a third plurality of expanded image beams.

According to this example, the optical device wherein the first waveguide may further include a first mirror configured to receive the first portion of guided image beams and provide a reflected first portion of guided image beams; and a first aperture expander positioned in a first region, the first aperture expander may be configured to receive the reflected first portion of guided image beams and provide the first plurality of expanded image beams, wherein the first waveguide may be configured to receive the second portion of guided image beams and provide a transmitted second portion of guided image beams; and wherein the second waveguide may further include a second mirror configured to receive the transmitted second portion of guided image beams and provide a reflected second portion of guided image beams; and a second aperture expander positioned in a second region that may be laterally displaced from the first region, the second aperture expander configured to receive the reflected second portion of guided image beams and provide a second plurality of expanded image beams, wherein the second waveguide may be configured to receive the first plurality of expanded image beams and provide a transmitted first plurality of expanded image beams.

According to this example, the optical device wherein the first aperture expander may include a first plurality of partially reflecting facets disposed in the first region, the first mirror and the first plurality of partially reflecting facets being parallel to each other and disposed at a first angle relative to a long axis of the first waveguide, and wherein the second aperture expander may further include a second plurality of partially reflecting facets disposed in the second region, the second mirror and the second plurality of partially reflecting facets may be parallel to each other and disposed at a second angle relative to a long axis of the second waveguide, the second angle may be different from the first angle. According to this example, the optical device wherein the reflected first portion of guided image beams may be reflected within the first waveguide by total internal reflection between a first waveguide front surface and a first waveguide rear surface, and wherein the reflected second portion of guided image beams may be reflected within the second waveguide by total internal reflection between a second waveguide front surface and a second waveguide rear surface.

According to this example, the optical device wherein the first waveguide may further include a first diffraction grating configured to receive the first portion of guided image beams and provide a diffracted first portion of guided image beams; a first aperture expander positioned in a first region, the first aperture expander may be configured to receive the diffracted first portion of guided image beams and provide the first plurality of expanded image beams, wherein the first waveguide may be configured to receive the second portion of guided image beams and provide a transmitted second portion of guided image beams; and wherein the second waveguide may further include a third diffraction grating configured to receive the transmitted second portion of guided image beams and provide a diffracted second portion of guided image beams; a second aperture expander positioned in a second region that may be laterally displaced from the first region, the second aperture expander may be configured to receive the diffracted second portion of guided image beams and provide a second plurality of expanded image beams, wherein the second waveguide may be configured to receive the first plurality of expanded image beams and provide a transmitted first plurality of expanded image beams.

According to this example, the optical device wherein the first aperture expander may include a second diffraction grating configured to receive the diffracted first portion of guided image beams and provide the first plurality of expanded image beams, and wherein the second aperture expander may include a fourth diffraction grating configured to receive the diffracted second portion of guided image beams and provide the second plurality of expanded image beams. According to this example, the optical device wherein the diffracted first portion of guided image beams may be reflected within the first waveguide by total internal reflection between a first waveguide front surface and a first waveguide rear surface, and wherein the diffracted second portion of guided image beams may be reflected within the second waveguide by total internal reflection between a second waveguide front surface and a second waveguide rear surface.

According to this example, the optical device may further include one of a third stacked waveguide arrangement comprising the first waveguide that may further include a first mirror configured to receive the first portion of guided image beams and provide a reflected first portion of guided image beams; and a first aperture expander may be positioned in a first region, the first aperture expander may include a first plurality of partially reflecting facets disposed in the first region, the first mirror and the first plurality of partially reflecting facets may be parallel to each other and may be disposed at a first angle relative to a long axis of the first waveguide, the first aperture expander may be configured to receive the reflected first portion of guided image beams and provide the first plurality of expanded image beams, wherein the first waveguide may be configured to receive the second portion of guided image beams and provide a transmitted second portion of guided image beams; and the second waveguide may further comprise a third diffraction grating configured to receive the transmitted second portion of guided image beams and provide a diffracted second portion of guided image beams; and a second aperture expander may be positioned in a second region that is laterally displaced from the first region, the second aperture expander may be configured to receive the diffracted second portion of guided image beams and may provide a second plurality of expanded image beams, wherein the second waveguide may be configured to receive the first plurality of expanded image beams and provide a transmitted first plurality of expanded image beams; and a fourth stacked waveguide arrangement may include the first waveguide and may further include a first diffraction grating configured to receive the first portion of guided image beams and provide a diffracted first portion of guided image beams; and a first aperture expander may be positioned in a first region, the first aperture expander may include a second diffraction grating disposed in the first region, the first aperture expander may be configured to receive the diffracted first portion of guided image beams and provide the first plurality of expanded image beams, wherein the first waveguide may be configured to receive the second portion of guided image beams and provide a transmitted second portion of guided image beams; and the second waveguide may further include a second mirror configured to receive the transmitted second portion of guided image beams and may provide a reflected second portion of guided image beams; and a second aperture expander may be positioned in a second region that may be laterally displaced from the first region, the second aperture expander may be configured to receive the reflected second portion of guided image beams and may provide a second plurality of expanded image beams, wherein the second waveguide may be configured to receive the first plurality of expanded image beams and provide a transmitted first plurality of expanded image beams.

According to this example, the optical device wherein one of the reflected first portion of guided image beams and the diffracted first portion of guided image beams may be reflected within the first waveguide by total internal reflection between a first waveguide front surface and a first waveguide rear surface and wherein one of the diffracted second portion of guided image beams and the reflected second portion of guided image beams may be reflected within the second waveguide by total internal reflection between a second waveguide front surface and a second waveguide rear surface. According to this example, the optical device wherein the third waveguide may further include a third aperture expander positioned in a third region and configured to receive the transmitted first plurality of expanded image beams and the second plurality of expanded image beams and provide a third plurality of expanded image beams to exit a third waveguide rear surface.

According to this example, the optical device wherein the third aperture expander may include a third plurality of partially reflecting facets that may be parallel to each other and may be disposed at a third angle that may be oblique to a third waveguide front surface, and wherein the transmitted first plurality of expanded image beams and the second plurality of expanded image beams may be reflected by total internal reflection between a third waveguide front surface and the third waveguide rear surface. According to this example, the optical device wherein the first dimension may be orthogonal to the second dimension.

According to this example, the optical device may further include an input coupler configured to receive a collimated image beam from an image projector and to provide the first portion of guided image beams and to provide the second portion of guided image beams, wherein the input coupler may include a reflective internal surface, the input coupler may be configured to receive the first portion of guided image beams having a first portion of sub-beams and a second portion of sub-beams, the input coupler may be configured to receive the second portion of guided image beams having a third portion of sub-beams and a fourth portion of sub-beams, the reflective internal surface configured to receive the first portion of sub-beams and provide a reflected first portion of sub-beams, the reflective internal surface may be configured to receive the third portion of sub-beams and provide a reflected third portion of sub-beams, wherein the first waveguide may be configured to receive the reflected first portion of sub-beams configured to propagate in a four-fold helical manner along the first waveguide and rotate in a first direction, the first waveguide may be configured to receive the second portion of sub-beams configured to propagate in a four-fold helical manner along the first waveguide and rotate in a second direction that may be opposite to the first direction, the reflected first portion of sub-beams and the second portion of sub-beams may be expanded to provide the first plurality of expanded image beams, an wherein the second waveguide may be configured to receive the reflected third portion of sub-beams configured to propagate in a four-fold helical manner along the second waveguide and rotate in a first direction, the second waveguide may be configured to receive the fourth portion of sub-beams configured to propagate in a four-fold helical manner along the second waveguide and rotate in a second direction that may be opposite the first direction, the reflected third portion of sub-beams and the fourth portion of sub-beams being expanded to provide the second plurality of expanded image beams.

According to this example, the optical device may further include an image projector disposed adjacent to the input coupler and configured to provide a collimated image beam corresponding to an image field based on a digital image, the collimated image beam including the first portion of guided image beams corresponding to the first image field, the collimated image beam including the second portion of guided image beams corresponding to the second image field, wherein the collimated image beam may be collimated to infinity. According to this example, the optical device may further include a first input coupler configured to receive a first collimated image beam from a first image projector and to provide the first portion of guided image beams; and a second input coupler that may be configured to receive a second collimated image beam from a second image projector and to provide the second portion of guided image beams, wherein the first input coupler may include a first reflective internal surface, the first input coupler may be configured to receive the first portion of guided image beams having a first portion of sub-beams and a second portion of sub-beams, the reflective internal surface may be configured to receive the first portion of sub-beams and provide a reflected first portion of sub-beams, wherein the first waveguide may be configured to receive the reflected first portion of sub-beams configured to propagate in a four-fold helical manner along the first waveguide and rotate in a first direction, the first waveguide may be configured to receive the second portion of sub-beams configured to propagate in a four-fold helical manner along the first waveguide and rotate in a second direction that may be opposite to the first direction, the reflected first portion of sub-beams and the second portion of sub-beams may be expanded to provide the first plurality of expanded image beams, wherein the second input coupler may include a second reflective internal surface, the second input coupler may be configured to receive the second portion of guided image beams having a third portion of sub-beams and a fourth portion of sub-beams, the second reflective internal surface may be configured to receive the third portion of sub-beams and provide a reflected third portion of sub-beams, and wherein the second waveguide may be configured to receive the reflected third portion of sub-beams configured to propagate in a four-fold helical manner along the second waveguide and rotate in a first direction, the second waveguide may be configured to receive the fourth portion of sub-beams may be configured to propagate in a four-fold helical manner along the second waveguide and rotate in a second direction that may be opposite the first direction, the reflected third portion of sub-beams and the fourth portion of sub-beams may be expanded to provide the second plurality of expanded image beams.

According to this example, the optical device may further include a first image projector disposed adjacent to the first input coupler and configured to provide a first collimated image beam corresponding to the first image field based on at least a first portion of a digital image, the first collimated image beam including the first portion of guided image beams; and a second image projector disposed adjacent to the second input coupler and configured to provide a second collimated image beam corresponding to the second image field based on at least a second portion of the digital image, wherein the first collimated image beam and the second collimated image beam may be collimated to infinity.

According to this example, the optical device may further include at least one of: a first homogenizer disposed in a plane between a first waveguide top surface and a first waveguide bottom surface, and a second homogenizer disposed in a plane between a second waveguide top surface and a second waveguide bottom surface. According to this example, the optical device may further include at least one of: a first retarder waveplate disposed between a first waveguide bottom surface and a second waveguide top surface, the first retarder waveplate may be configured to receive at least one of the first plurality of expanded image beams and the transmitted second portion of guided image beams and to provide a first retarder output that may be at least one of rotated and depolarized; and a second retarder waveplate may be disposed between a second waveguide bottom surface and a third waveguide top surface, the second retarder waveplate may be configured to receive at least one of the second plurality of expanded image beams and the transmitted first plurality of expanded image beams and may provide a second retarder output that may be at least one of rotated and depolarized.

According to this example, the optical device may include at least one of: a first dielectric coating disposed on an input coupler bottom surface; a second dielectric coating disposed on a first waveguide bottom surface; and a third dielectric coating may be disposed on a second waveguide bottom surface. According to this example, the optical device may include at least one of: a frame may be configured to support the first waveguide, the second waveguide, and the third waveguide in relative position to each other, wherein the first waveguide and the second waveguide may be fully concealed within the frame; a first interface between an input coupler and the first waveguide may include a first air gap; a second interface between the first waveguide and the second waveguide includes a second air gap; and a third interface between the second waveguide and the third waveguide includes a third air gap.

The foregoing summary is illustrative only and is not intended to be in any way limiting. In addition to the illustrative examples, aspects, embodiments, and features described above, further examples, aspects, embodiments, and features will become apparent by reference to the drawings and the following detailed description. In the drawings, like reference numbers indicate identical or functionally similar elements.

BRIEF DESCRIPTION OF THE DRAWINGS

FIG. 2A illustrates a front plan view of an optical system including a light-guide, in accordance with various examples.

FIG. 2B illustrates a side plan view of an optical system including the light-guide of FIG. 2A, in accordance with various examples.

FIG. 4 illustrates a side plan view of an optical system including the light-guide of FIG. 3A, in accordance with various examples.

FIG. 5 illustrates a front plan view of image beams as applied to an input coupler, in accordance with various examples.

FIG. 6A illustrates a front plan view of an optical system including a light-guide, in accordance with various examples.

FIG. 6B illustrates a side plan view of an optical system including the light-guide of FIG. 6A, in accordance with various examples.

FIG. 7A illustrates a front plan view of an optical system including a light-guide, in accordance with various examples.

FIG. 7B illustrates a side plan view of an optical system including the light-guide of FIG. 7A, in accordance with various examples.

In the drawings, like reference numerals or characters indicate corresponding or like components.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

To be described in more detail below, a wearable device, such as a near eye display and/or smart glasses, can be implemented by a system and method described in accordance with the present disclosure and the various examples. The system can efficiently provide high quality optical information to a user in various applications.

Figure 1:
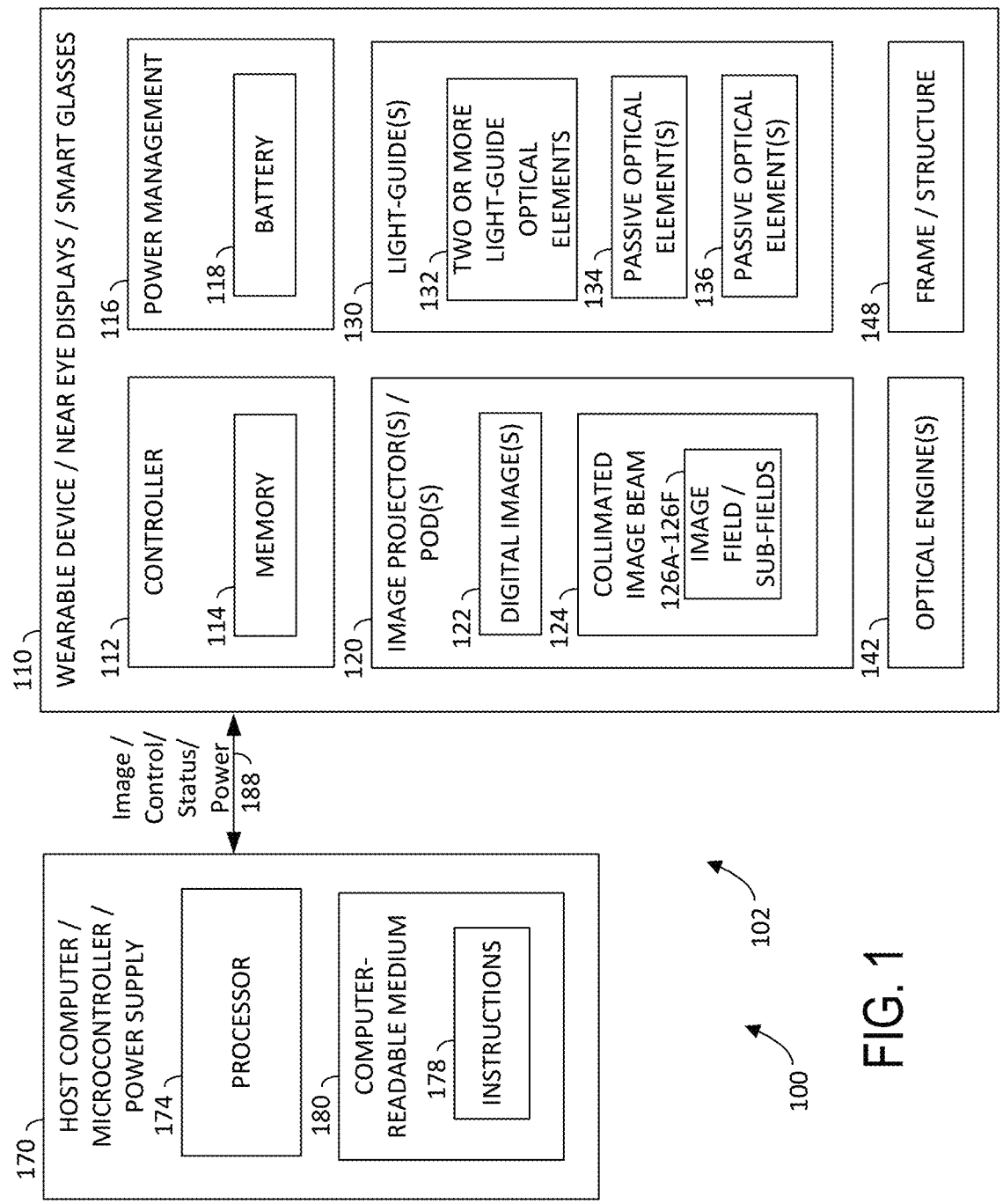
FIG. 1 illustrates a block diagram of an optical system, in accordance with various examples of the present disclosure.

FIG. 1 illustrates a block diagram of an optical system, in accordance with various examples of the present disclosure. Optical system 100 may include two or more devices or components. Optical system 100 may be implemented generally as a hybrid system including various electronic, optical, and electro-optical elements. An optical device 102 may include one or more elements from optical system 100. To be described in more detail below, an optical system 100 may include a wearable device 110, such as one or more near eye displays or smart glasses, which may be worn on or about the head of a user to convey optical information (e.g., a virtual image) to one or more eyes of a user. Both monocular and binocular applications are contemplated by the present disclosure. In various binocular implementations it is understood that some aspects of various elements related to power and/or processing may be shared.

Wearable device 110 may include a controller 112 with a memory 114 where controller 112 may be configured to send and receive electrical signals to various other elements in optical system 100, to execute program instructions stored in memory 114 in order to process and provide information, to operate wearable device 110, and to interact with other systems outside wearable device 110, for example. Controller 112 may include a microcontroller, a processor, various discrete components, programmable logic devices, and/or various interface circuits that may access memory 114 which may be removable, replaceable, programmable, and reprogrammable to update instructions to controller 112.

Wearable device 110 may also include a power management module 116 having a battery 118 (e.g., a battery module), where power management module 116 may be configured to charge, discharge, and monitor power usage for battery 118. Various elements of wearable device 110 may receive power from battery 118, including controller 112, one or more image projectors 120 (e.g., a projecting optical device, or POD) having one or more digital image(s) 122, and optical engine 142 may be configured to drive the one or more image projectors 120 to project the one or more digital image(s) 122, for example.

Wearable device 110 may also include one or more image projectors 120, each configured to produce a collimated image beam 124 (e.g., image illumination of a collimated image) based on a digital image 122. The collimated image beam may be an illuminated representation of digital image 122 having an image field 126 which is a two-dimensional representation of digital image 122 based on either a single graphical image (e.g., a static image) or a sequence of graphical images (e.g., a moving image). The collimated image beam may be collimated to infinity (e.g., an image at infinity). Image field 126 may include a plurality of image sub-fields 126A-126F corresponding to various regions of collimated image beam 124, where each sub-field 126A-126F may correspond to a plurality of different projection angles. For example, collimated image beam 124 may be composed of image field 126A corresponding to a first half of collimated image beam 124, image field 126D corresponding to a second half of collimated image beam 124. Image field 126A may further comprise a first portion 126B and a second portion 126C. Image field 126D may further comprise a third portion 126E and a fourth portion 126F.

Wearable device 110 may also include one or more light-guides 130, each including two or more light-guide optical elements 132 (e.g., LOEs) which may be denoted as waveguides (e.g., WGs). As used herein, the terms or phrases light-guide, light-guide optical element, and waveguide are related, and in some ways may be considered synonymous. Each light-guide optical element 132 may include one or more transparent material components configured to receive and propagate light, where light may enter into and exit from various external and internal surfaces of the one or more transparent material components. For example, the light-guide optical elements 132 may include optical glass or other suitable material that is transformed into various complex optical structures using a process that may include coating, stacking, slicing, polishing, and shaping the transparent materials. The process may also include the addition of partially reflective or fully reflective materials such as mirror coatings and one or more homogenizing elements on the surface of or within one or more of the light-guide optical elements 132, for example. Light-guide 130 may also include one or more passive optical elements 134 such as one or more input couplers or one more retarder waveplates, for example.

Wearable device 110 may also include one or more optical engines 142 coupled to the one or more image projectors 120 and one or more light-guides 130. Optical engine 142 may be configured to directly operate image projector 120 under the direction of the controller 112. For example, optical engine 142 may provide graphics processing for the digital image before projection of an illuminated representation of the one or more digital image(s) 122 by image projector 120.

Wearable device 110 may also include a frame 148 (e.g., a structure) for supporting and retaining two or more light-guide optical elements 132 (e.g., a first waveguide, a second waveguide, and a third waveguide) in relative position to each other in wearable device 110. For example, frame 148 may support and retain a first image projector 120 in position next to a first light-guide optical element 132. Similarly, frame 148 may support and retain a second image projector 120 in position next to a second light-guide optical element 132. In this manner, frame 148 may support and retain one or two image projector 120 and light-guide 130 pairs worn on or about the head of a user configured to provide a virtual image to one or both eyes of a user. References are made herein regarding the orientation of various elements relative to each other. Such references may also include reference to various elements of wearable device 110 when supported by frame 148 or in reference to a three-dimensional (3D) reference (e.g., X, Y, Z axes), as described in the relevant drawing figure.

Optical system 100 may also include a host computer 170 that may include a processor 174 configured to read and execute operations based on instructions 178 stored in a computer-readable medium 180. Instructions 178 may include at least some instructions provided to controller 112 and stored in memory 114. Host computer 170 may communicate with one or more elements of wearable device 110 over a bus 188 to send and/or receive power, status, control, and image information. In this manner, host computer 170 may provide power to charge battery 118, provide instructions to and receive status from controller 112 and various other elements of wearable device 110, and to provide data based on digital image 122 to optical engine 142.

FIG. 2A illustrates a front plan view of an optical system including a light-guide, in accordance with various examples. FIG. 2B illustrates a side plan view of an optical system including the light-guide of FIG. 2A, in accordance with various examples. As will be described more fully below, in various examples the present disclosure describes a pair of cascaded, or double-stacked rectangular waveguides, where each waveguide receives a portion of an input image field (e.g., roughly half), and where two sub-portions of each portion of an input image field may advance and be reflected within each waveguide by four-fold internal reflection while rotating in opposite directions (e.g., in a helical manner) within the waveguide, and where the two portions of the reflected and rotated input image fields may then both be coupled into a third waveguide and projected (e.g., outcoupled) as a virtual image to an eye of a user. Cascading two rectangular light-guides, optionally with low-refractive index materials, may enable transmission of a wider field of view (FoV) where each individual rectangular light-guide transmits only a portion of the final image, yet the portions of the final image are coupled into a third light-guide optical element, for example. FIG. 1 through FIG. 2B illustrates an optical system 100 that may include an optical device 202 with one or more optical elements of optical system 100. Optical device 202 may be similar in some ways to optical device 102 illustrated in FIG. 1. Optical device 202 may include a light-guide 130 with two or more light-guide optical elements 132.

According to an example, optical device 202 may include an input coupler 220 (e.g., a wedge-shaped coupling prism) configured to receive a collimated image beam 206 from an image projector 120 and configured to provide both a first portion of guided image beams 208 and a second portion of guided image beams 214. First portion of guided image beams 208 and second portion of guided image beams 214 may be separated into two halves by a first dividing plane 226 (e.g., corresponding to a YZ-plane, but represented as a line 226 in FIG. 2A) which bisects input coupler 220 in a left-right manner, as shown. Optical device 202 may include a first waveguide 230 that may have a first mirror 232 configured to receive (e.g., or couple-in) first portion of guided image beams 208 and provide a reflected first portion of guided image beams 234. First waveguide 230 may have a first aperture expander 240 positioned in a first region 242. First aperture expander 240 may include a plurality of partially reflecting facets 246 that may be mutually parallel to each other and to first mirror 232 and may be inclined at a first angle 239 relative to X-axis 294 (e.g., horizontal axis of first waveguide 230). A partially reflecting facet may be embedded within first waveguide 230 and implemented as a partially reflective mirror surface and may also be denoted as an embedded partial plane reflector, for example. First angle 239 may range from about 20° to 60° degrees and may correspond to a dynamic range that may depend on a reflection architecture of the facets. United States Patent Publication 20190064518 titled "Aperture Multiplier Using a Rectangular Waveguide", and assigned to Applicant, describes various details related to image rays propagating relative to partially reflecting internal facets in waveguides, for example. As used herein, the terms aperture expander, aperture expansion, and aperture multiplication to produce an expanded image beam may be considered equivalent with each other. First mirror 232 and first plurality of partially reflecting facets 246 being mutually parallel may result in greater tolerance of mechanical shift during the manufacturing process. Each of partially reflective facets 246 may have a reflectivity that is constant. Alternatively, the reflectivity of partially reflecting facets 246 may either increase or decrease in a direction away from first mirror 232 depending on the application. First aperture expander 240 may be configured to receive reflected first portion of guided image beams 234 and provide a first plurality of expanded image beams 248. First waveguide 230 may be configured to receive second portion of guided image beams 214 and provide a transmitted second portion of guided image beams 244. First portion of guided image beams 208 and second portion of guided image beams 214 may each correspond to substantially half of the projected image beam 206 from image projector 120, but other proportions may be used. Although FIG. 2A illustrates a gap between image projector 120 and input coupler 220, such a gap is for illustrative purposes and no gap may exist in an actual implementation, for this example and others. Thus, a half-image provided by first portion of guided image beams 208 may fill an available angular range within first waveguide 230.

Optical device 202 may include a second waveguide 250 having a second mirror 252 configured to receive transmitted second portion of guided image beams 244 and provide a reflected second portion of guided image beams 254. As described, first mirror 232 and second mirror 252 may be a fully reflective mirrors or partially reflective mirrors. First mirror 232 may have a different reflectivity compared with second mirror 252 to compensate for loss of light energy from first waveguide 230 through second waveguide 250, for example. Also, first mirror 232 may be partially reflective in the case that some portion of first mirror 232 overlaps laterally with (e.g., partially obscures) second mirror 252, for example. Second waveguide 250 may have a second aperture expander 260 positioned in a second region 262 that is laterally displaced 264 from first region 242.

Second aperture expander 260 may include a second plurality of partially reflecting facets 266 disposed in second region 262, where second plurality of partially reflecting facets 266 and second mirror 252 may be parallel to each other and disposed at second angle 259 which may be different from first angle 239. As above, second mirror 252 and second plurality of partially reflecting facets 266 being parallel may result in greater tolerance of mechanical shift during the manufacturing process. Similar to first angle 239, second angle 259 may also range from about 20° to 60° degrees and may correspond to a dynamic range that may depend on a reflection architecture of the facets. However, there may be a difference between first angle 239 and second angle 259 where the beams propagating along the respective waveguides may be propagating at the same angle even though they may originate from different angles as injected from image projector 120. For example, for a large field in a glass-like medium having a dynamic range of about 40 degrees (e.g., about 60 degrees in air), a difference between respective centers of two different field sections, such as first portion of guided image beams 208 and second portion of guided image beams 214, may have a dynamic range of approximately half, or about 20 degrees. In this example using mirror reflectors, the difference between the mirror angles for first angle 239 and second angle 259 may be about 10 degrees.

A first technical benefit of first angle 239 being different from second angle 259 may include an improved light homogenization and virtual image reproduction by avoiding image stitching, for example. A second technical benefit of having first angle 239 different from second angle 259 may include intensity compensation where the second angle 259 provides greater energy reflection capability after traversing a greater distance between second mirror 252 and second aperture expander 260 as compared with first mirror 232 and first aperture expander 240. Second aperture expander 260 may be configured to receive reflected second portion of guided image beams 254 and provide a second plurality of expanded image beams 268. Second waveguide 250 may be configured to receive first plurality of expanded image beams 248 and provide a transmitted first plurality of expanded image beams 278. Thus, a half-image provided by first portion of guided image beams 214 may fill an available angular range within second waveguide 250. Reflection from and transmission through input coupler 220 may enable total internal reflection (TIR) from first waveguide front surface 231 and first waveguide rear surface 233. Reflection from first mirror 232 may enable total internal reflection from first waveguide top surface 235 and first waveguide bottom surface 237. Reflection from second mirror 252 may enable total internal reflection from second waveguide top surface 255 and second waveguide bottom surface 257.

First aperture expander 240 and second aperture expander 260 may overlap laterally (e.g., horizontally as shown) by an overlap distance 290 that may range from between, for example, 1% to 20% of a length of first waveguide 230 and second waveguide 250, which may be preferably equal in length. Overlap distance 290 may preferably range from between 5% to 10% of the length of first waveguide 230. A technical benefit of first aperture expander 240 and second aperture expander 260 overlapping may promote continuity of the combined image, for example. Alternatively, first aperture expander 240 and second aperture expander 260 may not overlap, so the overlap distance 290 may be zero where image continuity is not an issue. As an alternative, the order (e.g., sequence of light processing) of first waveguide 230 and second waveguide 250 may be reversed. Further, another rectangular waveguide, similar to both first waveguide 230 and second waveguide 250, may also be used and may include another aperture expander that spans some or all of a lateral region of first aperture expander 240 and second aperture expander 260, for example. In yet another alternative, a separate, possibly smaller image projector 120, along with or without a separate coupling-in prism 220 may be used for each rectangular waveguide. When used without a separate coupling-in prism, each separate, projector 120 may be oriented at an appropriate angle relative to the respective waveguide to inject an input image beam 206 (or portion thereof) to induce four-fold internal reflection along the respective waveguide, as described.

Optical device 202 may include a third waveguide 270 (e.g., a "slab") with a third aperture expander 272 (e.g., oriented vertically) positioned in a third region 274 and configured to receive transmitted first plurality of expanded image beams 278 (e.g., guided-transmitted first plurality of expanded image beams 278) and second plurality of expanded image beams 268 and provide a third plurality of expanded image beams 280 to exit a third waveguide rear surface 273 toward an eye box 282 (e.g., an out-coupling region) and an eye 284 of a user or wearer of wearable device 110. A guided-transmitted beam may be distinguished from free-space transmitted beam that may be transmitted between optical components, for example. Third aperture expander 272 may include a third plurality of partially reflecting facets 276 that may be mutually parallel to each other and may be inclined at a third angle 279 relative to Y-axis 296 (e.g., vertical axis of third waveguide 270) and that is oblique to third waveguide front surface 271. For completeness, Z-axis 298 corresponds to direction that is perpendicular to an XY-plane.

Lateral (or vertical) aperture expansion may also be denoted as aperture multiplication. Thus, first waveguide 230, second waveguide 250, and third waveguide 270 together provide a two-dimensional (2-D) expansion of input image beam 206 from image projector 120. In this manner, first waveguide 230, second waveguide 250, and third waveguide 270 may be configured to receive and continuously reflect guided image beams to provide expanded image beams. Third plurality of partially reflecting facets 276 may be perpendicular to a YZ-plane. Alternatively, third partially of partially reflecting facets 276 may be inclined obliquely relative to both a YZ-plane and a set of elongated parallel external faces of third waveguide 270, such as third waveguide front surface 271 and third waveguide rear surface 273, for example. United States Patent Publication 20190064518, mentioned above, also describes how a waveguide may be illuminated using a single polarization (e.g., preferably s-polarization) with an orientation orthogonal to the waveguide surfaces, for example.

For various examples disclosed herein, first waveguide 230 may include a first waveguide front surface 231 and a first waveguide rear surface 233 that are parallel to each other. First waveguide 230 may also include a first waveguide top surface 235 and a first waveguide bottom surface 237 that are parallel to each other. Similarly, for various examples disclosed herein, second waveguide 250 may include a second waveguide front surface 251 and a second waveguide rear surface 253 that are parallel to each other. Second waveguide 250 may also include a second waveguide top surface 255 and a second waveguide bottom surface 257 that are parallel to each other. In this manner, the mutually parallel, opposite sides, and mutually parallel opposite top and bottom surfaces for each of the first waveguide 230 and second waveguide 250, may together describe a rectangular waveguide.

First waveguide 230 partially reflecting facets 246 may be perpendicular to first waveguide front surface 231, while second waveguide 250 partially reflecting facets 266 may be perpendicular to second waveguide front surface 251, for example. Alternatively, first plurality of partially reflecting facets 246 may be inclined obliquely relative to both sets of elongated parallel external faces of first waveguide 230, such as first waveguide front surface 231 and first waveguide rear surface 233 and/or first waveguide top surface 235 and first waveguide bottom surface 237, for example.

Similarly, second plurality of partially reflecting facets 266 may be inclined obliquely relative to both sets of elongated parallel external faces of second waveguide 250, such as second waveguide front surface 251 and second waveguide rear surface 253 and/or second waveguide top surface 255 and first waveguide bottom surface 257, for example. First waveguide bottom surface 237 may be disposed adjacent to second waveguide top surface 255.

Third waveguide 270 may include a third waveguide front surface 271 and third waveguide rear surface 273 that are parallel to each other. Third waveguide 270 may also include a third waveguide top surface 275 that may be disposed adjacent to second waveguide bottom surface 257. A bottom contour 277 of third waveguide 270 may have the form of an isosceles trapezoid but could also be smoothly curved, squared off, or the like. Thus, the sides (e.g., left-right sides shown in FIG. 2A) and bottom surface of third waveguide 270 may not be involved in the operation of light-guide 130. As illustrated in FIG. 2B, light-guide 130 may include a first interface 213 disposed between input coupler 220 and first waveguide 230, a second interface 215 disposed between first waveguide 230 and second waveguide 250, and a third interface 217 disposed between second waveguide 250 and third waveguide 270. Each of first interface 213, second interface 215, and third interface 217 may include an air gap of separation, a coating, or a passive optical element 134 such as a polarizer disposed in the interface, where these interface-mediums may preserve the total internal reflection (TIR) of the four-fold propagation in their associated rectangular waveguide. As shown in FIG. 2A-2B, first waveguide 230 may include reflective elements and second waveguide 250 may include reflective elements. Thus, optical device 202 and light-guide 130 may comprise a first stacked waveguide arrangement of a reflective type.

Figures 3A, 3B, 3C, 3D:
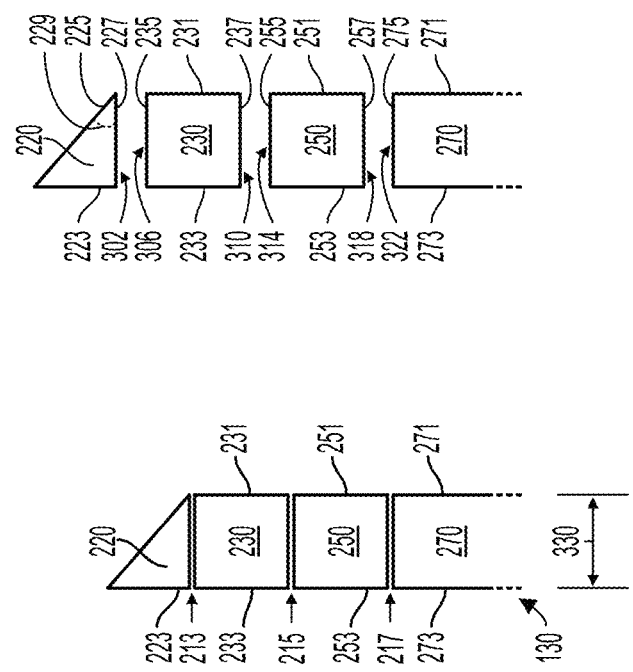
FIG. 3A illustrates a side plan view of an optical system including the light-guide of FIG. 2B, in accordance with various examples.
FIG. 3B illustrates a side plan exploded view of an optical system including the light-guide of FIG. 3A, in accordance with various examples.
FIG. 3C illustrates a side plan view of an optical system including an alternative light-guide, in accordance with various examples.
FIG. 3D illustrates a side plan view of an optical system including an alternative light-guide, in accordance with various examples.

FIG. 3A illustrates a side plan view of an optical system including the waveguide of FIG. 2B, in accordance with various examples. FIG. 3B illustrates a side plan exploded view of an optical system including the waveguide of FIG. 3A, in accordance with various examples. FIG. 3C illustrates a side plan view of an optical system including an alternative waveguide, in accordance with various examples. FIG. 3D illustrates a side plan view of an optical system including an alternative waveguide, in accordance with various examples. According to an example, a thickness 330 of first waveguide 230, second waveguide 250, and third waveguide 270 may be substantially equal. However, a relative height of first waveguide 230 compared with a height of second waveguide 250 may vary. Further, first waveguide front surface 231, second waveguide front surface 251, and third waveguide front surface 271 may be co-planar with each other. Hence, with an equal thickness and front surfaces being co-planar, it is understood that first waveguide rear surface 233, second waveguide rear surface 253, and third waveguide rear surface 273 may also be co-planar with each other. A technical benefit of equal thicknesses and co-planarity for first waveguide 230, second waveguide 250, and third waveguide 270 may include minimizing power loss in transmission of light between adjacent waveguides, for example. As described, each of the first waveguide 230, second waveguide 250, and third waveguide 270 have parallel front and rear surfaces so that light propagating and reflecting within each of the waveguides may be reflected by total internal reflection (TIR) between the corresponding front and rear surfaces within each of the waveguides.

First guided image beams 234 may be reflected within first waveguide 230 by total internal reflection between first waveguide front surface 231 and first waveguide rear surface 233 and the reflected light may exit first waveguide 230 at first waveguide bottom surface 237, for example. Because the first plurality of partially reflecting facets 246 is parallel to first mirror 232, light beams may couple out of first waveguide 230 at the same angle coupled in from input coupler 220, for example. Similarly, reflected second portion of guided image beams 254 may be reflected within second waveguide 250 by total internal reflection between second waveguide front surface 251 and second waveguide rear surface 253 and the reflected light may exit second waveguide 250 at second waveguide bottom surface 257, for example. Finally, transmitted first plurality of expanded image beams 248 and second plurality of expanded image beams 268 may be reflected by total internal reflection between third waveguide front surface 271 and third waveguide rear surface 273, and the reflected light may exit third waveguide rear surface 273 after reflection from third aperture expander 272.

In one example, FIG. 3A illustrates light-guide 130 may include first interface 213 disposed between input coupler 220 and first waveguide 230, second interface 215 disposed between first waveguide 230 and second waveguide 250, and third interface 217 disposed between second waveguide 250 and third waveguide 270. Each of first interface 213, second interface 215, and third interface 217 may include an air gap of separation, a coating, or a passive optical element 134 such as a polarizer disposed in the interface. Total internal reflection (TIR) guidance within first waveguide 230 and second waveguide 250 may be improved by the application of various optical coatings, presence of an air-gap, and or the use of low-refractive index material above or below first waveguide 230 and/or second waveguide 250.

FIG. 3B illustrates a side plan exploded view of an optical system including the light-guide of FIG. 3A, in accordance with various examples. An input coupler bottom surface 227 may include a first coating 302, first waveguide top surface 235 may include a second coating 306, first waveguide bottom surface 237 may include a third coating 310, second waveguide top surface 255 may include a fourth coating 314, second waveguide bottom surface 257 may include a fifth coating 318, and third waveguide top surface 275 may include a sixth coating 322. Each of the coatings may be uniform across the surface of the relevant portions and may include at least one layer of a dielectric coating, a dielectric reflective coating, a varying reflective coating, or a partially transmissive mirror coating which may have a polarization dependency.

FIG. 3C illustrates a side plan view of an optical system including an alternative light-guide, in accordance with various examples. A retarder waveplate is a passive optical element 134 that may be composed of birefringent, crystalline, or polymer materials that may be used to create a phase shift between polarization components in a light beam. A retarder waveplate may be used to at least one of rotate and depolarize a light beam passing through the retarder waveplate without attenuating, deviating, or displacing the light beam. As illustrated in FIG. 3C, a first retarder waveplate 304 may be disposed at first interface 213 between at least a portion of the region between input coupler bottom surface 227 and first waveguide top surface 235 and configured to at least one of rotate and depolarize at least some portion of the light passing from input coupler 220 to first waveguide 230. A second retarder waveplate 312 may be disposed at second interface 215 between at least a portion of the region between first waveguide bottom surface 237 and second waveguide top surface 255 and configured to at least one of rotate and depolarize at least some portion of the light passing from first waveguide 230 to second waveguide 250. Finally, a third retarder waveplate 320 may be disposed at third interface 217 between at least a portion of the region between second waveguide bottom surface 257 and third waveguide top surface 275 and configured to at least one of rotate and depolarize at least some portion of the light passing from second waveguide 250 to third waveguide 270. Second retarder waveplate 312 may be used to reorient light reflected from first plurality of partially reflecting facets 246 and/or third retarder waveplate 320 may be used to reorient light reflected from either/both first plurality of partially reflecting facets 246 and second plurality of partially reflecting facets 266 to fit polarization needed for third plurality of partially reflecting facets 276, in some applications.

FIG. 4 illustrates a side plan view of an optical system including the waveguide of FIG. 3A, in accordance with various examples. In reference to FIG. 2A through FIG. 4, input coupler 220 may have a reflective internal surface 408 (e.g., a reflective internal face) and be configured to receive the first portion of guided image beams 208 with a first portion of sub-beams 210 and a second portion of sub-beams 212. Input coupler 220 may also be configured to receive second portion of guided image beams 214 with a third portion of sub-beams 216 and a fourth portion of sub-beams 218. Reflective internal surface 408 may be disposed on a rear surface 223 of input coupler 220 as shown in FIGS. 3A-3C and FIG. 4 and may be configured to receive first portion of sub-beams 210 and provide a reflected first portion of sub-beams 410. Alternatively, as shown in reference to FIG. 3D, reflective internal surface 408 may be disposed on a front surface 221 of input coupler 220 when input coupler 220 is rotated 180-degrees so that image projector 120 may be mounted in a symmetrically opposite orientation, for example.

Reflective internal surface 408 may be configured to receive third portion of sub-beams 216 and provide a reflected third portion of sub-beams 416. Further, second portion of sub-beams 212 and fourth portion of sub-beams 218 may be configured to pass through input coupler 220 without reflecting from reflective internal surface 408. In this manner, reflected first portion of sub-beams 410 and un-reflected second portion of sub-beams 412 may exit input coupler bottom surface 227 at different predetermined angles and enter first waveguide top surface 235 at substantially the same exiting angles because input coupler bottom surface 227 is substantially parallel to first waveguide top surface 235. As described in reference to FIG. 2A, first portion of guided image beams 208 and second portion of guided image beams 214 may be separated into two halves by a first dividing plane 226 which bisects input coupler 220 in a left-right manner, as shown. Similarly, FIG. 4 illustrates first portion of sub-beams 210 and second portion of sub-beams 212 may be further separated by a second dividing plane 426 (e.g., corresponding to a plane that includes X-axis 294, but represented as a line 426 in FIG. 4) which bisects first portion of guided image beams 208 into a top-half 404 (e.g., back half) with first portion of sub-beams 210 and a bottom-half 406 (e.g., front half) with sub-beams 212.

Reflected first portion of sub-beams 410 may enter first waveguide top surface 235 and be reflected from first mirror 232 inclined at a first angle 239 relative to X-axis 294 (e.g., horizontal axis of first waveguide 230) to become reflected first portion of sub-beams 236 rotating in a first direction 432, and second portion of sub-beams 412 may enter first waveguide top surface 235 and be reflected from first mirror 232 to become reflected second portion of sub-beams 238 rotating in a second direction 434 which may be opposite to first direction 432. In this manner, due to coupling of an image 206 from image projector 120 through input coupler 220 which is inclined at a coupling angle 229, then reflecting a first half of the coupled image at a first angle 239 and a second half of the coupled image at a second angle 259, an initial direction of propagation at a coupling angle that may be oblique to opposite pairs of parallel faces of first waveguide 230 may cause the coupled-in image to advance by four-fold internal reflection along first waveguide 230. Thus, reflected first portion of sub-beams 236 and reflected second portion of sub-beams 238 may be propagated within first waveguide 230 in substantially opposite directions while traversing the length of first waveguide 230 in a direction away from first mirror 232 in what may be described as a four-fold, helical (e.g., helix) or a corkscrew-like manner.

United States Patent Publication 20190064518, mentioned above, also describes various details related to four-fold internal reflection in an elongated waveguide, for example. In this manner, an image from an image projector may be coupled into an optical waveguide with an initial direction of propagation at a coupling angle that is oblique to opposite pairs of parallel faces so the image advances by four-fold internal reflection along the waveguide. In the presently described examples, the propagated image beams may be then coupled into an adjacent waveguide. First aperture expander 240 may include a first plurality of partially reflecting facets 246 disposed in first region 242. As reflected first portion of sub-beams 236 and reflected second portion of sub-beams 238 propagate in a direction away from first mirror 232 in a four-fold, helical manner, reflected first portion of sub-beams 236 and reflected second portion of sub-beams 238 may enter first region 242 and be reflected by first aperture expander 240 to provide first plurality of expanded image beams 248 configured to exit from first waveguide bottom surface 237. Thus, reflected first portion of sub-beams 236 and reflected second portion of sub-beams 238 may be expanded in a first dimension (e.g., X-axis 294 direction).

Reflected third portion of sub-beams 416 and un-reflected fourth portion of sub-beams 418 may exit input coupler bottom surface 227 at different predetermined angles and enter first waveguide top surface 235 at substantially the same exiting angles because input coupler bottom surface 227 is substantially parallel to first waveguide top surface 235. As mentioned above, first waveguide 230 may be configured to receive second portion of guided image beams 214, comprising reflected third portion of sub-beams 416 and fourth portion of sub-beams 418, and provide a transmitted second portion of guided image beams 244 which passes through first waveguide 230 from first waveguide top surface 235 to first waveguide bottom surface 237 while being reflected by total internal reflection between first waveguide front surface 231 and first waveguide rear surface 233 and may exit from first waveguide bottom surface 237 at different predetermined angles and enter second waveguide top surface 255 at substantially the same exiting angles because first waveguide bottom surface 237 is substantially parallel to second waveguide top surface 255.

Transmitted second portion of guided image beams 244 may pass through first waveguide 230 in a region adjacent to first mirror 232, where some portion of transmitted second portion of guided image beams 244 (e.g., derived from second portion of guided image beams 214) may overlap in region 292 and be reflected by first mirror 232 to address image overlap. Alternatively, none of transmitted second portion of guided image beams 244 may overlap or be reflected by first mirror 232, so that first mirror 232 only reflects first portion of guided image beams 208 and does not reflect any of second portion of guided image beams 214 where image overlap may not be an issue.

Transmitted second portion of guided image beams 244 (derived from reflected third portion of sub-beams 416 and un-reflected fourth portion of sub-beams 218) may enter second waveguide top surface 255 and be reflected from second mirror 252 inclined at a second angle 259 relative to X-axis 294 ((e.g., long axis of second waveguide 250)) to become reflected third portion of sub-beams 256 rotating in a first direction 452, and fourth portion of sub-beams 218 may enter second waveguide top surface 255 and be reflected from first mirror 232 to become reflected fourth portion of sub-beams 258 rotating in a second direction 454 which may be opposite to first direction 452. Thus, reflected third portion of sub-beams 256 and reflected fourth portion of sub-beams 258 may be propagated within second waveguide 250 in substantially opposite directions while traversing the length of second waveguide 250 in a direction away from second mirror 252 in a four-fold, helical manner.

As reflected third portion of sub-beams 256 and reflected fourth portion of sub-beams 258 propagate in a direction away from second mirror 252 in a four-fold, helical manner, reflected third portion of sub-beams 256 and reflected second portion of sub-beams 258 may enter second region 262 and be reflected by second aperture expander 260 to provide second plurality of expanded image beams 268 configured to exit from second waveguide bottom surface 257. As reflected third portion of sub-beams 256 and reflected fourth portion of sub-beams 258 propagate in a direction away from second mirror 252 in a four-fold, helical manner, reflected third portion of sub-beams 256 and reflected fourth portion of sub-beams 258 may enter second region 262 and be reflected by second aperture expander 260 to provide second plurality of expanded image beams 268 configured to exit from second waveguide bottom surface 257. Thus, reflected third portion of sub-beams 256 and reflected fourth portion of sub-beams 258 may be expanded in a first dimension (e.g., X-axis 294 direction).

First waveguide 230 may include a first homogenizer 286 disposed in a parallel plane disposed vertically about midway between first waveguide top surface 235 and first waveguide bottom surface 237, and disposed horizontally (e.g., laterally) between first mirror 232 and a first partially reflective facet 246 of first aperture expander 240. Similarly, second waveguide 250 may include a second homogenizer 288 disposed in a parallel plane disposed vertically about midway between second waveguide top surface 255 and second waveguide bottom surface 257, and disposed horizontally (e.g., laterally) between second mirror 252 and a first partially reflective facet 266 of second aperture expander 260. Various light homogenizers may be used, alone or in combination with each other, to provide improved illumination uniformity, among other benefits. Homogenizers (286, 288) may comprise a partial plane reflector as a semi-reflective surface, a partially transmissive surface, or film added within the corresponding waveguide (230,250). When present, a transmissive homogenizer disposed within a waveguide may effectively double the number of reflected beams by reflecting incident light beams traversing the waveguide in an ascending or descending manner. By ascending, some portion of light from below the homogenizer may reflect off a homogenizer lower surface and a remaining portion of the ascending light beam may pass through the homogenizer, effectively doubling the number of light beams. By descending, some portion of light from above the homogenizer may reflect off a homogenizer upper surface, and a remaining portion of the descending light beam may pass through the homogenizer, effectively doubling the number of light beams.

According to an example, optical system 100 may include a frame 148 (e.g., a structural element) configured to support wearable device 110, two or more of controller 112, memory 114, power management module 116, battery 118, image projector 120, light-guide 130 including two or more light-guide optical elements 132 such as first waveguide 230, second waveguide 250, third waveguide 270, optical engine 142, first waveguide 230, second waveguide 250, and third waveguide 270 in relative position to each other. In an example, frame 148 may support input coupler 220 and first waveguide 230 so that a first interface 213 between input coupler 220 and first waveguide 230 includes a first air gap. In an example, frame 148 may support first waveguide 230 and second waveguide 250 so that a second interface 215 between first waveguide 230 and second waveguide 250 includes a second air gap. In an example, frame 148 may support second waveguide 250 and third waveguide 270 so that a third interface 217 between second waveguide 250 and third waveguide 270 includes a third air gap. In an example, frame 148 may support first waveguide 230 and second waveguide 250 so that first waveguide 230 and second waveguide 250 may be fully concealed within frame 148, for example.

FIG. 5 illustrates a front plan view of image beams as applied to an input coupler, in accordance with various examples. In reference to FIG. 4 and FIG. 5, an input face 225 of input coupler 220 may be divided into four quadrants by first dividing plane 226 and second dividing plane 426. As shown, image beam 206 from image projector 120 may be directed to input face 225 of input coupler 220 at an intersection of first dividing plane 226 and second dividing plane 426. First portion of guided image beams 208 corresponding to first portion of sub-beams 210 may be directed at least partially to a reflective internal face of input coupler rear surface 223 to reflect back into input coupler 220 as reflected first portion of sub-beam 410 and enter first waveguide 230 at first mirror 232 as reflected first portion of sub-beams 236 at a predetermined angle depending on the origin of the image pixel image field corresponding to image beams at first quadrant Q1. First portion of guided image beams 208 corresponding to second portion of sub-beams 212 may be directed to pass through input coupler bottom surface 227 and enter first waveguide 230 at first mirror 232 as reflected second portion of sub-beams 238 at another predetermined angle depending on the origin of the image pixel image field corresponding to image beams at second quadrant Q2. Similarly, second portion of guided image beams 214 corresponding to third portion of sub-beams 216 may be directed at least partially to a reflective internal face of input coupler rear surface 223 to reflect back into input coupler 220 as reflected third portion of sub-beam 416 and enter first waveguide 230 adjacent to first mirror 232 as a first portion of transmitted second portion of guided image beams 244 at a predetermined angle depending on the origin of the image pixel image field corresponding to image beams at first quadrant Q3. Second portion of guided image beams 214 corresponding to second portion of sub-beams 218 may be directed to pass through input coupler bottom surface 227 and enter first waveguide 230 adjacent to first mirror 232 as a second portion of transmitted second portion of guided image beams 244 at another predetermined angle depending on the origin of the image pixel image field corresponding to image beams at second quadrant Q4.

According to an example, an optical system 100 may include an image projector 120 configured to produce a collimated image beam 206 based on a digital image 122, wherein the collimated image beam may be collimated to infinity. Optical system 100 may include an input coupler 220 configured to receive collimated image beam 206 from image projector 120 and configured to provide both a first portion of guided image beams 208 and a second portion of guided image beams 214. As will be described more fully below, first portion of guided image beams 208 may include a first portion of sub-beams 210 and a second portion of sub-beams 212. Further, second portion of guided image beams 214 may include a third portion of sub-beams 216 and a fourth portion of sub-beams 218.

Optical system 100 may include a first waveguide 230 with a first mirror 232 that may be configured to receive the first portion of guided image beams 208 and provide a reflected first portion of guided image beams 234. First waveguide may have a first aperture expander 240 positioned in a first region 242. First aperture expander 240 may be configured to receive the reflected first portion of guided image beams 234 and provide a first plurality of expanded image beams 248, where reflected first portion of guided image beams 234 may be expanded laterally along X-axis 294 to provide a first plurality of expanded image beams 248 that may exit from first waveguide bottom surface 237, for example. First waveguide 230 may be configured to receive second portion of guided image beams 214 and provide a transmitted second portion of guided image beams 244.

Optical system 100 may include a second waveguide 250 with a second mirror 252 that may be configured to receive the transmitted second portion of guided image beams 244 and provide a reflected second portion of guided image beams 254. Second waveguide 250 may have a second aperture expander 260 positioned in a second region 262 that may be laterally displaced 264 from first region 242. Second aperture expander 260 may be configured to receive reflected second portion of guided image beams 254 and provide a second plurality of expanded image beams 268, where reflected second portion of guided image beams 254 may be expanded laterally along X-axis 294 to provide a second plurality of expanded image beams 268 that may exit from second waveguide bottom surface 257, for example. Second waveguide 250 may be configured to receive first plurality of expanded image beams 248 and provide a transmitted first plurality of expanded image beams 278 to exit from second waveguide bottom surface 257.

Optical system 100 may include a third waveguide 270 that may have a third aperture expander 272 (e.g., oriented vertically) positioned in a third region 274 configured to receive transmitted first plurality of expanded image beams 278 and second plurality of expanded image beams 268 and provide a third plurality of expanded image beams 280 to exit a third waveguide rear surface 273 toward an eye box 282 and an eye 284 of a user or wearer of wearable device 110. Third aperture expander 272 may include a plurality of partially reflecting facets 276 that may be mutually parallel to each other and may be inclined at a third angle 279 relative to Y-axis 296 (e.g., vertical axis of third waveguide 270) and that is oblique to third waveguide front surface 271, where transmitted first plurality of expanded image beams 248 and second plurality of expanded image beams 268 may be expanded vertically along Y-axis 296, for example. In some examples, a light-guide 130 may include passive and active optical components as various light-guide optical elements 132 (LOEs), including input coupler 220, first waveguide 230, second waveguide 250, and third waveguide 270.

FIG. 6A illustrates a front plan view of an optical system including a light-guide, in accordance with various examples. FIG. 6B illustrates a side plan view of an optical system including the light-guide of FIG. 6A, in accordance with various examples. Image beam propagation in FIGS. 6A-6B may be analogous to the beam propagation described in reference to FIG. 1 through FIG. 5, where corresponding reference numbers may indicate corresponding functions.

According to an example, an optical device 602 may include an input coupler 220 configured to receive a collimated image beam 206 from an image projector 120 and to provide both a first portion of guided image beams 208 and a second portion of guided image beams 214. Optical device 602 may be similar in some ways to optical device 102 illustrated in FIG. 1 and optical device 202 illustrated in FIGS. 2A-2B. In reference to FIG. 2A through FIG. 4, input coupler 220 may have a reflective internal surface 408 (e.g., a reflective internal face) and be configured to receive the first portion of guided image beams 208 with a first portion of sub-beams 210 and a second portion of sub-beams 212. Input coupler 220 may also be configured to receive second portion of guided image beams 214 with a third portion of sub-beams 216 and a fourth portion of sub-beams 218. Reflective internal surface 408 may be disposed on a rear surface 223 of input coupler 220 as shown in FIG. 3A through FIG. 6B and may be configured to receive first portion of sub-beams 210 and provide a reflected first portion of sub-beams 410, as described. Similarly, rear surface 223 of input coupler 220 may be configured to receive third portion of sub-beams 216 and provide a reflected third portion of sub-beams 416, as described. Thus, reflected first portion of sub-beams 410, second portion of sub-beams 212, reflected third portion of sub-beams 416, and fourth portion of sub-beams 218 may exit from input coupler bottom surface 227 at different angles, as described.

Optical device 602 may include a first waveguide 630 having a first diffraction grating 632 that may be configured to receive reflected first portion of sub-beams 410 and provide diffracted first portion of sub-beams 636. First diffraction grating 632 may be configured to receive second portion of sub-beams 212 and provide diffracted second portion of sub-beams 638. Together, diffracted first portion of sub-beams 636 and diffracted second portion of sub-beams 638 comprise a diffracted first portion of guided image beams 634 configured to advance by four-fold internal reflection along first waveguide 630 while rotating in opposite directions (e.g., in a helical manner). First diffraction grating 632 may be disposed adjacent to and co-planar with first waveguide top surface 635, for example. First waveguide 630 may include a first aperture expander 640 configured to receive the diffracted first portion of guided image beams 634 and provide a first plurality of expanded image beams 648.

First aperture expander 640 may be implemented as a second diffraction grating 646 configured to expand diffracted first portion of diffracted image beams 634 in a first dimension (e.g., expand laterally across a long axis 294 of first waveguide 630) to provide a first plurality of expanded image beams 648 that may exit from first waveguide bottom surface 637. Second diffraction grating 646 may be disposed adjacent to and co-planar with first waveguide bottom surface 637. In this manner, first diffraction grating 632 and second diffraction grating 646 may be implemented as two diffractive elements having an opposing optical power to cancel chromatic dispersion. First waveguide 630 may be configured to receive the second portion of guided image beams 214 and provide a transmitted second portion of guided image beams 244. First waveguide 630 may be similar in some ways to first waveguide 230 described in reference to FIGS. 2A-2B.

A diffraction grating, such as first diffraction grating 632, may be a passive optical element described generally as a diffractive optical element or a transmissive diffractive component having a partially reflecting surface with a periodic structure (e.g., two-dimensional periodicity) that receives an incident light beam and provides a plurality of light beams at different angles where the diffraction grating may be embedded within a light-guide optical element 132 such as first waveguide 630, for example. As used herein, a diffraction grating may be a refractive or reflective beam expander configured to receive an input beam on a first side and provide a plurality of output beams from a second side, where the output beams may be expanded in a first dimension (e.g., a lateral dimension) and may be used to receive and redirect light beams, similar to first mirror 232, as described in reference to FIG. 2A, for example. Also, a diffractive optical element such as a diffraction grating may also be used as an aperture expander, similar to the plurality of parallel partially reflective facets 246 in first aperture expander 240, as described in reference to FIG. 2A, and elsewhere.

Optical device 602 may include a second waveguide 650 having a third diffraction grating 652 that may be configured to receive reflected third portion of sub-beams 416 and provide diffracted third portion of sub-beams 656. Third diffraction grating 652 may be configured to receive fourth portion of sub-beams 218 and provide diffracted fourth portion of sub-beams 658. Together, diffracted second portion of sub-beams 656 and diffracted second portion of sub-beams 658 comprise a diffracted second portion of guided image beams 654 configured to advance by four-fold internal reflection along first waveguide 630 while rotating in opposite directions (e.g., in a helical manner). Third diffraction grating 652 may be disposed adjacent to and co-planar with second waveguide top surface 655, for example. Second waveguide 650 may include a second aperture expander 660 positioned in a second region 662 that is laterally displaced 664 from first region 642 and configured to receive the diffracted second portion of guided image beams 654 and provide a second plurality of expanded image beams 668.

Second aperture expander 660 may be implemented as a fourth diffraction grating 666 configured to expand diffracted second portion of diffracted image beams 654 in a first dimension (e.g., expand laterally across a long axis 294 of second waveguide 650) to provide a second plurality of expanded image beams 668 that may exit from second waveguide bottom surface 657. Fourth diffraction grating 666 may be disposed adjacent to and co-planar with second waveguide bottom surface 657. In this manner, third diffraction grating 652 and fourth diffraction grating 666 may be implemented as two diffractive elements having an opposing optical power to cancel chromatic dispersion. Second waveguide 650 may be configured to receive first plurality of expanded image beams 648 and provide a transmitted first plurality of expanded image beams 678. Second waveguide 650 may be similar in some ways to second waveguide 250 described in reference to FIGS. 2A-2B.

First aperture expander 640 and second aperture expander 660 may overlap laterally (e.g., horizontally as shown) by an overlap distance 690 that may range from between 1% to 20% of a length of first waveguide 630 and second waveguide 650, which may be preferably equal in length. Overlap distance 690 may preferably range from between 5% to 10% of the length of first waveguide 630. A technical benefit of first aperture expander 640 and second aperture expander 660 overlapping may promote continuity of the combined image, for example. Alternatively, first aperture expander 640 and second aperture expander 660 may not overlap, so the overlap distance 690 may be zero where image continuity is not an issue.

Optical device 602 may include a third waveguide 270 with a third aperture expander 272 (e.g., oriented vertically) positioned in a third region 274 and configured to receive the transmitted first plurality of expanded image beams 678 and the second plurality of expanded image beams 668 and provide a third plurality of expanded image beams 280 to exit a third waveguide rear surface 273 toward an eye box 282 and an eye 284 of a user or wearer of wearable device 110. In this manner, third aperture expander 272 may be configured to expand transmitted first plurality of expanded image beams 678 and second plurality of expanded image beams 668 in a second dimension (e.g., expand vertically across a vertical axis 296 of third waveguide 270) that is orthogonal to the first dimension.

First waveguide 630 may include a first homogenizer 686 disposed in a parallel plane disposed vertically about midway between first waveguide top surface 635 and first waveguide bottom surface 637, and disposed horizontally (e.g., laterally) between first diffraction grating 632 and first aperture expander 640. In particular, first homogenizer 686 may be disposed horizontally in a position that may overlap a portion of either or both of first diffraction grating 632 and second diffraction grating 646. Alternatively, first homogenizer 686 may not overlap any portion of either first diffraction grating 632 or second diffraction grating 646. Similarly, second waveguide 650 may include a second homogenizer 688 disposed in a parallel plane disposed vertically about midway between second waveguide top surface 655 and second waveguide bottom surface 657, and disposed horizontally (e.g., laterally) between third diffraction grating 652 and fourth expansion grating 666. In particular, second homogenizer 688 may be disposed horizontally in a position that may overlap a portion of either or both of third diffraction grating 652 and fourth diffraction grating 666. Alternatively, second homogenizer 688 may not overlap any portion of either third diffraction grating 652 or fourth diffraction grating 666.

According to an example, optical device 602 may include a frame 148 (e.g., a structural element) configured to support wearable device 110, two or more of controller 112, memory 114, power management module 116, battery 118, image projector 120, light-guide 130 including two or more light-guide optical elements 132 such as first waveguide 630, second waveguide 650, third waveguide 270, optical engine 142, first waveguide 630, second waveguide 650, and third waveguide 270 in relative position to each other. In an example, frame 148 may support input coupler 220 and first waveguide 630 so that a first interface 213 between input coupler 220 and first waveguide 630 includes a first air gap. In an example, frame 148 may support first waveguide 630 and second waveguide 650 so that a second interface 215 between first waveguide 630 and second waveguide 650 includes a second air gap. In an example, frame 148 may support second waveguide 650 and third waveguide 270 so that a third interface 217 between second waveguide 650 and third waveguide 270 includes a third air gap. In an example, frame 148 may support first waveguide 630 and second waveguide 650 so that first waveguide 630 and second waveguide 650 may be fully concealed within frame 148. As shown in FIG. 6A-6B, first waveguide 630 may include diffractive elements and second waveguide 650 may include diffractive elements. Thus, optical device 602 and light-guide 130 may comprise a second stacked waveguide arrangement of a diffractive type.

FIG. 7A illustrates a front plan view of an optical system including a light-guide, in accordance with various examples. FIG. 7B illustrates a side plan view of an optical system including the light-guide of FIG. 7A, in accordance with various examples. According to an example, optical device 702 may include a first input coupler 220A configured to receive a first collimated image beam 206A from a first image projector 120A and to provide a first portion of guided image beams. Optical device 702 may include a second input coupler 220B configured to receive a second collimated image beam 206B from a second image projector 120B and to provide the second portion of guided image beams.

As described in reference to FIG. 1 to FIG. 7B, a first waveguide 730 may be configured to receive and expand in a first dimension 294 a first portion of guided image beams 208 based on a first image field 126A and to provide a first plurality of expanded image beams 248. A second waveguide 750 may be disposed adjacent to first waveguide 730 and configured to receive and expand in the first dimension one of a second portion of guided image beams 214 and a transmitted second portion of guided image beams 244 corresponding to a second image field 126D that is different from the first image field and to provide a second plurality of expanded image beams 268. Second waveguide 750 may be configured to receive the first plurality of expanded image beams and provide a transmitted first plurality of expanded image beams 278. Third waveguide 270 may be disposed adjacent to second waveguide 750 on a side opposite first waveguide 730. Third waveguide 270 may be configured to receive and expand in a second dimension 296 transmitted first plurality of expanded image beams 278 and second plurality of expanded image beams 268 to provide third plurality of expanded image beams 280. First waveguide 730 may have a first aperture expander 740 positioned in a first region 742. Second waveguide 750 may have a second aperture expander 760 positioned in a second region 762 that is laterally displaced 764 from first region 242. First aperture expander 740 and second aperture expander 760 may overlap laterally (e.g., horizontally as shown) by an overlap distance 790 that may range from between, for example, 1% to 20% of a length of first waveguide 730 and second waveguide 750, which may be preferably equal in length.

First input coupler 220A may include a first input coupler rear surface 223A having a reflective surface similar to reflective surface 408. Similarly, second input coupler 220B may include a second input coupler rear surface 223B having a reflective surface similar to reflective surface 408. First waveguide 230 may include a first homogenizer 786 disposed in a parallel plane disposed vertically about midway between first waveguide top surface 735 and first waveguide bottom surface 737, and disposed horizontally (e.g., laterally) between a first mirror or a first diffraction grating and a first aperture expander. Similarly, second waveguide 750 may include a second homogenizer 788 disposed in a parallel plane disposed vertically about midway between second waveguide top surface 755 and second waveguide bottom surface 757, and disposed horizontally (e.g., laterally) between a second mirror or a third diffraction grating and a second aperture expander. Various light homogenizers may be used, alone or in combination with each other, to provide improved illumination uniformity, among other benefits.

According to various examples disclosed herein, first waveguide 730 may include reflective elements and second waveguide 750 may include reflective elements so that optical device 702 and light-guide 130 may comprise a first stacked waveguide arrangement 761 of a reflective type, also illustrated in FIG. 2A-2B. Alternatively, first waveguide 730 may include diffractive elements and second waveguide 750 may include diffractive elements so that optical device 702 and light-guide 130 may comprise a second stacked waveguide arrangement 763 of a reflective type, also illustrated in FIG. 6A-6B. In another alternative, first waveguide 730 may include reflective elements and second waveguide 750 may include diffractive elements so that optical device 702 and light-guide 130 may comprise a third stacked waveguide arrangement 765 of a mixed reflective and diffractive type. In yet another alternative, first waveguide 730 may include diffractive elements and second waveguide 750 may include reflective elements so that optical device 702 and light-guide 130 may comprise a fourth stacked waveguide arrangement 767 of a mixed diffractive and reflective type.

As illustrated in FIG. 1-7B, optical device 702 may comprise a third stacked waveguide arrangement 765 which may include first waveguide 730 having a first mirror 232 configured to receive first portion of guided image beams 208 and provide a reflected first portion of guided image beams 234. First waveguide 730 may include a first aperture expander 740 positioned in a first region 742. First aperture expander 740 may include a first plurality of partially reflecting facets 246 disposed in first region 742. First mirror 232 and first plurality of partially reflecting facets 246 may be parallel to each other and disposed at a first angle 239 relative to a long axis 294 of first waveguide 730. First aperture expander 740 may be configured to receive reflected first portion of guided image beams 234 and provide a first plurality of expanded image beams 248, where first waveguide 730 may be configured to receive second portion of guided image beams 214 and provide a transmitted second portion of guided image beams 244. Optical device 702 may include second waveguide 750 that further a third diffraction grating 652 configured to receive transmitted second portion of guided image beams 244 and provide a diffracted second portion of guided image beams 654. Second waveguide 750 may include a second aperture expander 760 positioned in a second region 762 that is laterally displaced 764 from first region 742. Second aperture expander 760 may be configured to receive diffracted second portion of guided image beams 654 and provide second plurality of expanded image beams 668, wherein second waveguide 730 may be configured to receive first plurality of expanded image beams 648 and provide transmitted first plurality of expanded image beams 678. Thus, first waveguide 730 may include reflective elements and second waveguide 750 may include diffractive elements so that optical device 702 and light-guide 130 may comprise a third stacked waveguide arrangement 765 having a mixed reflective and diffractive type.

Optical device 702 may comprise a fourth stacked waveguide arrangement 767 which may include first waveguide 730 having a first diffraction grating 632 configured to receive the first portion of guided image beams 208 and provide a diffracted first portion of guided image beams. First waveguide 730 may include a first aperture expander 740 positioned in a first region 742. First aperture expander 740 may include a second diffraction grating 646 disposed in first region 742. First aperture expander 740 may be configured to receive diffracted first portion of guided image beams 634 and provide first plurality of expanded image beams 648, where first waveguide 730 is configured to receive second portion of guided image beams 214 and provide a transmitted second portion of guided image beams 244. Second waveguide 750 may further include a second mirror 252 configured to receive the transmitted second portion of guided image beams 244 and provide a reflected second portion of guided image beams 254. Second aperture expander 760 may be positioned in a second region 762 that is laterally displaced 764 from first region 742. Second aperture expander 760 may be configured to receive the reflected second portion of guided image beams 254 and provide a second plurality of expanded image beams 268, where second waveguide 750 is configured to receive first plurality of expanded image beams 248 and provide transmitted first plurality of expanded image beams 278. Thus, first waveguide 730 may include diffractive elements and second waveguide 750 may include reflective elements so that optical device 702 and light-guide 130 may comprise a fourth stacked waveguide arrangement 767 having a mixed diffractive and reflective type.

According to an example, optical system 100 may include an optical device 702 comprising three waveguides that are each defined by at least two parallel front and back external faces, and where a collimated plurality of image beams may be guided within the three waveguides by total internal reflection. A first waveguide 730 may be configured to receive and expand in a first dimension a first portion of guided image beams based on a first image field and to provide a first plurality of expanded image guided beams in a section of first waveguide 730, for example. A second waveguide 750 may be disposed adjacent to first waveguide 730, where a section of second waveguide 750 may configured to receive and expand in the first dimension a second portion of guided image beams based on a second image field that is different from the first image field and to provide a second plurality of expanded guided image beams. A same or a different section of second waveguide 750 may also be set to transmit the first plurality of expanded guided beams, for example. A third waveguide 270 may be disposed adjacent to second waveguide 750 on a side opposite first waveguide 730, where third waveguide 270 may be configured to receive and expand in a second dimension the transmitted first plurality of expanded image guided beams and the second plurality of expanded image guided beams to provide a third plurality of expanded image beams which are unguided.

According to an example, at least one of the waveguides may provide a plurality of expanded image beams by using a set of mutually parallel embedded plane partial reflectors. Guided image beams may be coupled in to at least one of the waveguides by reflection from an embedded reflector (e.g., a partially or fully reflective mirror) that is parallel with the plurality of mutually parallel partial plane reflectors, for example. In this manner, reflection may be used for coupling in, expanding, and coupling out. Alternatively, at least one of the waveguides may provide a plurality of expanded image beams, where guided image beams may be coupled in by diffraction from a first diffracting element and then expanded by diffraction from a second diffracting element in the same waveguide prior to coupling out. In this manner, diffraction may be used for coupling in, expanding, and coupling out.

A single image projector may be used to project collimated image beams onto a coupling-in arrangement of first waveguide 730 and second waveguide 750 where the coupling in arrangements may be offset from each other so that a first section of the field projects onto the first coupling arrangement and a second section of the field projects onto the second coupling arrangement. Alternatively, two image projectors may be used to project collimated image beams separately into the coupling in arrangements of each waveguide. At least one of first waveguide 730 and second waveguide 750 may include another pair of parallel external faces (e.g., top and bottom faces) that are perpendicular to the front and back faces, and that also reflect the image beams to propagate and advance by four-fold reflection along an optical path within the at least one waveguide. Thus, image beams may advance in a helical (e.g., a helix) or corkscrew-like manner. At least some of the plurality of expanded guided beams of first image portion from first waveguide may pass though the section in the second waveguide that provides expansion for the second image portion. Such overlap of image beams may provide for improved continuity. A homogenizer (e.g., a mixer), such as a partial reflector including partially reflective or fully reflective materials, may be incorporated within at least one of the waveguides, where the partial reflector may be parallel to one of the external faces of the at least one waveguide.

Various features in the various examples described separately above may be combined together unless they are incompatible with each other. For example, each of the features described in reference to FIG. 1 through FIG. 5 may be combined with the features described in reference to FIGS. 6A-6B and FIGS. 7A-7B, if such features are technically compatible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Also, terms such as top, bottom, above, adjacent, below, vertical, horizontal, lateral, side, fore, aft, and the like may describe relative placement of elements in a particular view illustrated in the drawings and should not be considered limiting. Such terminology may be applied oppositely when a view or element is inverted, for example.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The various embodiments were chosen and described in order to best explain the principles of the invention and the practical application, and to enable others of ordinary skill in the art to understand the invention for various embodiments with various modifications as are suited to the particular use contemplated.

What is claimed is:

1. An optical device comprising:
   a first waveguide configured to receive and expand in a first dimension a first portion of guided image beams based on a first image field and to provide a first plurality of expanded image beams;
   a second waveguide disposed adjacent to the first waveguide, the second waveguide configured to receive and expand in the first dimension one of a second portion of guided image beams and a transmitted second portion of guided image beams corresponding to a second image field that is different from the first image field and to provide a second plurality of expanded image beams, the second waveguide configured to receive the first plurality of expanded image beams and provide a transmitted first plurality of expanded image beams; and
   a third waveguide disposed adjacent to the second waveguide on a side opposite the first waveguide, the third waveguide configured to receive and expand in a second dimension the transmitted first plurality of expanded image beams and the second plurality of expanded image beams to provide a third plurality of expanded image beams.

2. The optical device of claim 1,
   wherein the first waveguide further comprises:
      a first mirror configured to receive the first portion of guided image beams and provide a reflected first portion of guided image beams; and
      a first aperture expander positioned in a first region, the first aperture expander configured to receive the reflected first portion of guided image beams and provide the first plurality of expanded image beams,
      wherein the first waveguide is configured to receive the second portion of guided image beams and provide a transmitted second portion of guided image beams; and
   wherein the second waveguide further comprises:
      a second mirror configured to receive the transmitted second portion of guided image beams and provide a reflected second portion of guided image beams; and
      a second aperture expander positioned in a second region that is laterally displaced from the first region, the second aperture expander configured to receive the reflected second portion of guided image beams and provide a second plurality of expanded image beams,
      wherein the second waveguide is configured to receive the first plurality of expanded image beams and provide a transmitted first plurality of expanded image beams.

3. The optical device of claim 2,
   wherein the first aperture expander comprises a first plurality of partially reflecting facets disposed in the first region, the first mirror and the first plurality of partially reflecting facets being parallel to each other and disposed at a first angle relative to a long axis of the first waveguide, and
   wherein the second aperture expander comprises a second plurality of partially reflecting facets disposed in the second region, the second mirror and the second plurality of partially reflecting facets being parallel to each other and disposed at a second angle relative to a long axis of the second waveguide, the second angle being different from the first angle.

4. The optical device of claim 3,
   wherein the reflected first portion of guided image beams are reflected within the first waveguide by total internal reflection between a first waveguide front surface and a first waveguide rear surface, and
   wherein the reflected second portion of guided image beams are reflected within the second waveguide by total internal reflection between a second waveguide front surface and a second waveguide rear surface.

5. The optical device of claim 1,
   wherein the first waveguide further comprises:
      a first diffraction grating configured to receive the first portion of guided image beams and provide a diffracted first portion of guided image beams;
      a first aperture expander positioned in a first region, the first aperture expander configured to receive the diffracted first portion of guided image beams and provide the first plurality of expanded image beams,
      wherein the first waveguide is configured to receive the second portion of guided image beams and provide a transmitted second portion of guided image beams; and
   wherein the second waveguide further comprises:
      a third diffraction grating configured to receive the transmitted second portion of guided image beams and provide a diffracted second portion of guided image beams;
      a second aperture expander positioned in a second region that is laterally displaced from the first region, the second aperture expander configured to receive the diffracted second portion of guided image beams and provide a second plurality of expanded image beams,
      wherein the second waveguide is configured to receive the first plurality of expanded image beams and provide a transmitted first plurality of expanded image beams.

6. The optical device of claim 5,
   wherein the first aperture expander includes a second diffraction grating configured to receive the diffracted first portion of guided image beams and provide the first plurality of expanded image beams, and
   wherein the second aperture expander includes a fourth diffraction grating configured to receive the diffracted second portion of guided image beams and provide the second plurality of expanded image beams.

7. The optical device of claim 6,
   wherein the diffracted first portion of guided image beams are reflected within the first waveguide by total internal reflection between a first waveguide front surface and a first waveguide rear surface, and
   wherein the diffracted second portion of guided image beams are reflected within the second waveguide by total internal reflection between a second waveguide front surface and a second waveguide rear surface.

8. The optical device of claim 1, further comprising one of:
   a third stacked waveguide arrangement comprising:
      the first waveguide further comprises:
         a first mirror configured to receive the first portion of guided image beams and provide a reflected first portion of guided image beams; and a first aperture expander positioned in a first region, the first aperture expander including a first plurality of partially reflecting facets disposed in the first region, the first mirror and the first plurality of partially reflecting facets being parallel to each other and disposed at a first angle relative to a long axis of the first waveguide, the first aperture expander configured to receive the reflected first portion of guided image beams and provide the first plurality of expanded image beams, wherein the first waveguide is configured to receive the second portion of guided image beams and provide a transmitted second portion of guided image beams; and the second waveguide further comprises:
a third diffraction grating configured to receive the transmitted second portion of guided image beams and provide a diffracted second portion of guided image beams; and a second aperture expander positioned in a second region that is laterally displaced from the first region, the second aperture expander configured to receive the diffracted second portion of guided image beams and provide a second plurality of expanded image beams, wherein the second waveguide is configured to receive the first plurality of expanded image beams and provide a transmitted first plurality of expanded image beams; and a fourth stacked waveguide arrangement comprising:
the first waveguide further comprises:
a first diffraction grating configured to receive the first portion of guided image beams and provide a diffracted first portion of guided image beams; and a first aperture expander positioned in a first region, the first aperture expander including a second diffraction grating disposed in the first region, the first aperture expander configured to receive the diffracted first portion of guided image beams and provide the first plurality of expanded image beams, wherein the first waveguide is configured to receive the second portion of guided image beams and provide a transmitted second portion of guided image beams; and the second waveguide further comprises:
a second mirror configured to receive the transmitted second portion of guided image beams and provide a reflected second portion of guided image beams; and a second aperture expander positioned in a second region that is laterally displaced from the first region, the second aperture expander configured to receive the reflected second portion of guided image beams and provide a second plurality of expanded image beams, wherein the second waveguide is configured to receive the first plurality of expanded image beams and provide a transmitted first plurality of expanded image beams.

9. The optical device of claim 8,
wherein one of the reflected first portion of guided image beams and the diffracted first portion of guided image beams are reflected within the first waveguide by total internal reflection between a first waveguide front surface and a first waveguide rear surface, and
wherein one of the diffracted second portion of guided image beams and the reflected second portion of guided image beams are reflected within the second waveguide by total internal reflection between a second waveguide front surface and a second waveguide rear surface.

10. The optical device of claim 1,
wherein the third waveguide further comprises:
a third aperture expander positioned in a third region and configured to receive the transmitted first plurality of expanded image beams and the second plurality of expanded image beams and provide a third plurality of expanded image beams to exit a third waveguide rear surface.

11. The optical device of claim 10,
wherein the third aperture expander comprises a third plurality of partially reflecting facets that are parallel to each other and are disposed at a third angle that is oblique to a third waveguide front surface, and
wherein the transmitted first plurality of expanded image beams and the second plurality of expanded image beams are reflected by total internal reflection between a third waveguide front surface and the third waveguide rear surface.

12. The optical device of claim 1, wherein the first dimension is orthogonal to the second dimension.

13. The optical device of claim 1, further comprising:
an input coupler configured to receive a collimated image beam from an image projector and to provide the first portion of guided image beams and to provide the second portion of guided image beams,
wherein the input coupler includes a reflective internal surface, the input coupler configured to receive the first portion of guided image beams having a first portion of sub-beams and a second portion of sub-beams, the input coupler configured to receive the second portion of guided image beams having a third portion of sub-beams and a fourth portion of sub-beams, the reflective internal surface configured to receive the first portion of sub-beams and provide a reflected first portion of sub-beams, the reflective internal surface configured to receive the third portion of sub-beams and provide a reflected third portion of sub-beams,
wherein the first waveguide is configured to receive the reflected first portion of sub-beams configured to propagate in a four-fold helical manner along the first waveguide and rotate in a first direction, the first waveguide is configured to receive the second portion of sub-beams configured to propagate in a four-fold helical manner along the first waveguide and rotate in a second direction that is opposite the first direction, the reflected first portion of sub-beams and the second portion of sub-beams being expanded to provide the first plurality of expanded image beams, and
wherein the second waveguide is configured to receive the reflected third portion of sub-beams configured to propagate in a four-fold helical manner along the second waveguide and rotate in a first direction, the second waveguide is configured to receive the fourth portion of sub-beams configured to propagate in a four-fold helical manner along the second waveguide and rotate in a second direction that is opposite the first direction, the reflected third portion of sub-beams and the fourth portion of sub-beams being expanded to provide the second plurality of expanded image beams.

14. The optical device of claim 13, further comprising:
an image projector disposed adjacent to the input coupler and configured to provide a collimated image beam corresponding to an image field based on a digital image, the collimated image beam including the first portion of guided image beams corresponding to the first image field, the collimated image beam including the second portion of guided image beams corresponding to the second image field, wherein the collimated image beam is collimated to infinity.

15. The optical device of claim 1, further comprising:
a first input coupler configured to receive a first collimated image beam from a first image projector and to provide the first portion of guided image beams; and
a second input coupler configured to receive a second collimated image beam from a second image projector and to provide the second portion of guided image beams,
wherein the first input coupler includes a first reflective internal surface, the first input coupler configured to receive the first portion of guided image beams having a first portion of sub-beams and a second portion of sub-beams, the first reflective internal surface configured to receive the first portion of sub-beams and provide a reflected first portion of sub-beams,
wherein the first waveguide is configured to receive the reflected first portion of sub-beams configured to propagate in a four-fold helical manner along the first waveguide and rotate in a first direction, the first waveguide is configured to receive the second portion of sub-beams configured to propagate in a four-fold helical manner along the first waveguide and rotate in a second direction that is opposite the first direction, the reflected first portion of sub-beams and the second portion of sub-beams being expanded to provide the first plurality of expanded image beams,
wherein the second input coupler includes a second reflective internal surface, the second input coupler configured to receive the second portion of guided image beams having a third portion of sub-beams and a fourth portion of sub-beams, the second reflective internal surface configured to receive the third portion of sub-beams and provide a reflected third portion of sub-beams, and
wherein the second waveguide is configured to receive the reflected third portion of sub-beams configured to propagate in a four-fold helical manner along the second waveguide and rotate in a first direction, the second waveguide is configured to receive the fourth portion of sub-beams configured to propagate in a four-fold helical manner along the second waveguide and rotate in a second direction that is opposite the first direction, the reflected third portion of sub-beams and the fourth portion of sub-beams being expanded to provide the second plurality of expanded image beams.

16. The optical device of claim 15, further comprising:
a first image projector disposed adjacent to the first input coupler and configured to provide a first collimated image beam corresponding to the first image field based on at least a first portion of a digital image, the first collimated image beam including the first portion of guided image beams; and
a second image projector disposed adjacent to the second input coupler and configured to provide a second collimated image beam corresponding to the second image field based on at least a second portion of the digital image,
wherein the first collimated image beam and the second collimated image beam are collimated to infinity.

17. The optical device of claim 1, further comprising at least one of:
a first homogenizer disposed in a plane between a first waveguide top surface and a first waveguide bottom surface, and
a second homogenizer disposed in a plane between a second waveguide top surface and a second waveguide bottom surface.

18. The optical device of claim 1, further comprising at least one of:
a first retarder waveplate disposed between a first waveguide bottom surface and a second waveguide top surface, the first retarder waveplate configured to receive at least one of the first plurality of expanded image beams and the transmitted second portion of guided image beams and to provide a first retarder output that is at least one of rotated and depolarized; and
a second retarder waveplate disposed between a second waveguide bottom surface and a third waveguide top surface, the second retarder waveplate configured to receive at least one of the second plurality of expanded image beams and the transmitted first plurality of expanded image beams and to provide a second retarder output that is at least one of rotated and depolarized.

19. The optical device of claim 1, further comprising at least one of:
a first dielectric coating disposed on an input coupler bottom surface;
a second dielectric coating disposed on a first waveguide bottom surface; and
a third dielectric coating disposed on a second waveguide bottom surface.

20. The optical device of claim 1, comprising at least one of:
a frame configured to support the first waveguide, the second waveguide, and the third waveguide in relative position to each other, wherein the first waveguide and the second waveguide are fully concealed within the frame;
a first interface between an input coupler and the first waveguide includes a first air gap;
a second interface between the first waveguide and the second waveguide includes a second air gap; and
a third interface between the second waveguide and the third waveguide includes a third air gap.

* * * * *